US012360547B2

(12) United States Patent
Kok Keong Lum et al.

(10) Patent No.: US 12,360,547 B2
(45) Date of Patent: Jul. 15, 2025

(54) HIGHLY TUNABLE ULTRA-LOW TEMPERATURE COEFFICIENT BANDGAP PRECISION REFERENCE CIRCUIT

(71) Applicant: MPICS INNOVATIONS PTE. LTD, Singapore (SG)

(72) Inventors: Richard Kok Keong Lum, Singapore (SG); Jodi Lee Mei Hong, Singapore (SG)

(73) Assignee: MPICS INNOVATIONS PTE. LTD, Singapore (SG)

( * ) Notice: Subject to any disclaimer, the term of this patent is extended or adjusted under 35 U.S.C. 154(b) by 519 days.

(21) Appl. No.: 17/831,639

(22) Filed: Jun. 3, 2022

(65) Prior Publication Data

US 2023/0393603 A1 Dec. 7, 2023

(51) Int. Cl.
*G05F 3/22* (2006.01)

(52) U.S. Cl.
CPC .................................... *G05F 3/222* (2013.01)

(58) Field of Classification Search
CPC ............. G05F 3/222; G05F 3/30; G05F 3/225
USPC .......................................... 323/313; 327/539
See application file for complete search history.

(56) References Cited

U.S. PATENT DOCUMENTS 11,983,026 B2 * 5/2024 Eberlein ................... G05F 3/30
2003/0227322 A1 * 12/2003 Ozoe ....................... G05F 3/262 327/541
2007/0279029 A1 * 12/2007 Cave ......................... G05F 3/30 323/313
2017/0023967 A1 * 1/2017 Lee ......................... G05F 3/262
2020/0125129 A1 * 4/2020 Ibrahim ..................... G05F 3/30
2022/0253087 A1 * 8/2022 Gupta ..................... G11C 5/147
2023/0297127 A1 * 9/2023 Eberlein ................... G05F 3/30

FOREIGN PATENT DOCUMENTS

CN 1977225 A * 6/2007 ............. G05F 3/262

OTHER PUBLICATIONS

Machine Translation CN 1977225 (Year: 2007).*

* cited by examiner

*Primary Examiner* — Thienvu V Tran
*Assistant Examiner* — Yahveh Comas Torres
(74) *Attorney, Agent, or Firm* — Sheridan Ross P.C.

(57) ABSTRACT

A method, system, and circuit for providing a bandgap voltage reference are provided. In an example, the method includes producing a first bandgap curve based at least in part on a first circuit, a second circuit, an operational amplifier, and one or more feedback resistors, where the first circuit corresponds to a first voltage that is complementary to absolute temperature (CTAT) and the second circuit corresponds to a second voltage that is proportional to absolute temperature (PTAT). The method also includes providing a temperature independent compensation to the first bandgap curve based at least in part on a bandgap device, a biasing circuit, and a resistor; providing a non-temperature compensation to the first bandgap curve based at least in part on an adjustable divider circuit; and generating a resulting bandgap curve from the first bandgap curve.

17 Claims, 11 Drawing Sheets

HIGHLY TUNABLE ULTRA-LOW TEMPERATURE COEFFICIENT BANDGAP PRECISION REFERENCE CIRCUIT

BACKGROUND

The present disclosure is generally directed to bandgap reference circuits and relates more particularly to a bandgap reference circuit design for lower temperature coefficients.

Many electronic circuits (e.g., integrated circuits (ICs)) require a stable voltage reference, and in particular, a temperature stable voltage reference. For example, a stable voltage reference or a reliable constant voltage reference may be an essential component of electronic circuits that provide respective applications ranging from purely analog systems to mixed-signal systems to purely digital circuit systems. Additionally, power converters, regulators, flash memory controllers, and converters (e.g., buck converters, analog-to-digital converters (ADCs), digital-to-analog converters (DACs), etc.) are some example applications that require a voltage reference for efficient operations. Voltage reference circuits for providing constant voltage references may be provided as bandgap reference circuits that are designed to operably sum two voltages with opposite temperature slopes so as to provide the output reference voltage. The bandgap reference circuits may provide the constant voltage references regardless of power supply variations, temperature changes, or circuit loading from a device.

BRIEF SUMMARY

Example aspects of the present disclosure include:

A circuit for providing a bandgap voltage reference, the circuit including: a first subcircuit that corresponds to a first voltage that is complementary to absolute temperature (CTAT); a second subcircuit that corresponds to a second voltage that is proportional to absolute temperature (PTAT); an operational amplifier that receives the first voltage of the first subcircuit and the second voltage of the second subcircuit, wherein a reference voltage is produced at an output of the operational amplifier based at least in part on the first voltage and the second voltage; one or more feedback resistors coupled to the output of the operational amplifier and the first subcircuit, coupled to the output of the operational amplifier and the second subcircuit, or a combination thereof; a biasing subcircuit coupled to the first subcircuit via a resistor, wherein the biasing subcircuit is substantially temperature independent and provides adjustments to a curvature of the reference voltage; the resistor coupled to the biasing subcircuit and the first subcircuit, wherein the resistor, in part, controls the curvature of the reference voltage; a bandgap device coupled to the biasing subcircuit and the resistor, the bandgap device providing an alternate path for current to flow in the circuit via the resistor, wherein the bandgap device, in part, flattens the curvature of the reference voltage; and an adjustable divider subcircuit coupled to the output of the operational amplifier, the first subcircuit, the second subcircuit, and the bandgap device, wherein the adjustable divider subcircuit provides non-temperature adjustments to the curvature of the reference voltage.

In some embodiments, the reference voltage produced at the output of the operational amplifier comprises a temperature independent compensation and a non-temperature compensation, the temperature independent compensation being applied to the reference voltage based at least in part on the bandgap device and the biasing subcircuit, and the non-temperature compensation being applied to the reference voltage based at least in part on the adjustable divider subcircuit.

In some embodiments, the biasing subcircuit includes: a temperature independent voltage source; a transistor, wherein a base of the transistor is coupled to the temperature independent voltage source; and an additional resistor coupled to an emitter of the transistor, wherein an opposing end of the additional resistor not coupled to the emitter is coupled to the resistor and the bandgap device.

In some embodiments, the temperature independent voltage source is adjustable to adjust a peak of a bandgap curve associated with the bandgap device, and wherein adjusting the peak of the bandgap curve lowers a temperature coefficient of the circuit.

In some embodiments, the temperature independent voltage source is set to 1.25 volts (V).

In some embodiments, the bandgap device conditionally conducts current in the circuit based at least in part on a voltage across a base and an emitter of the bandgap device being less than a voltage associated with the biasing subcircuit, a temperature of the circuit being greater than or equal to a threshold value, a temperature of an environment surrounding the circuit being greater than or equal to the threshold value, or a combination thereof.

In some embodiments, the first subcircuit and the second subcircuit produce a first bandgap curve via the operational amplifier, and the bandgap device produces an additional bandgap curve such that, when the additional bandgap curve is applied to the first bandgap curve, a resulting bandgap curve is produced that comprises an adjusted version of the first bandgap curve.

In some embodiments, the adjusted version of the first bandgap curve comprises the resulting bandgap curve having a shifted peak that occurs at a higher temperature compared to a peak of the first bandgap curve, the resulting bandgap having a flatter curve compared to the first bandgap curve, or both.

In some embodiments, the resistor controls and balances a current flowing through the first subcircuit and the bandgap device.

In some embodiments, the adjustable divider subcircuit includes: a first resistor coupled to the output of the operational amplifier, the bandgap device, the first subcircuit, and the second subcircuit; and a second resistor coupled to the first resistor, the bandgap device, the first subcircuit, and the second subcircuit.

In some embodiments, the second resistor comprises a variable resistor that is adjustable to resistance values between 0% and 5% of a resistance value for the first resistor.

In some embodiments, the adjustable divider subcircuit is substantially temperature independent based at least in part on the first resistor being coupled to the output of the operational amplifier.

In some embodiments, a resistance value for the second resistor is affected by a magnitude of 5% or less based at least in part on a temperature of the circuit changing or a temperature of a surrounding environment changing.

In some embodiments, the biasing subcircuit includes: a transistor, wherein a base of the transistor is coupled to the reference voltage at the output of the operational amplifier and the one or more feedback resistors; and an additional resistor coupled to an emitter of the transistor, the resistor, and the bandgap device.

In some embodiments, the circuit further includes: an adjustable current generator coupled to the biasing subcircuit and an additional resistor; and the additional resistor coupled to the adjustable current generator, the output of the operational amplifier, and the one or more feedback resistors, wherein the reference voltage is dependent on the adjustable current generator based at least in part on the coupling of the additional resistor.

In some embodiments, the resistor comprises a variable resistor that has an adjustable resistance value to control how much current flows through the first subcircuit and the bandgap device.

In some embodiments: the first subcircuit comprises a first transistor; the second subcircuit comprises a second transistor and an additional resistor; the bandgap device comprises a third transistor; and/or the biasing subcircuit comprises a fourth transistor.

In some embodiments a circuit for providing a bandgap voltage reference is provided that includes: a primary sub circuit comprising a plurality of components configured to generate a first bandgap curve; a compensation subcircuit comprising a plurality of transistors coupled to the primary subcircuit, wherein the compensation subcircuit is configured to provide compensation to the first bandgap curve to generate an adjusted bandgap curve that adjusts a curvature of the first bandgap curve; and a tuning subcircuit comprising a plurality of resistors coupled to the compensation subcircuit and the primary subcircuit, wherein the tuning subcircuit is tunable to adjust a flatness of the adjusted bandgap curve generated in part by the compensation subcircuit.

In some embodiments, a reference voltage corresponding to the adjusted bandgap curve generated by the primary subcircuit, the compensation subcircuit, and the tuning subcircuit comprises a temperature independent compensation and a non-temperature compensation, the temperature independent compensation being applied to the reference voltage based at least in part on the compensation subcircuit, and the non-temperature compensation being applied to the reference voltage based at least in part on the tuning subcircuit.

In some embodiments, a method for providing a bandgap voltage reference is provided that includes: producing a first bandgap curve based at least in part on a first circuit, a second circuit, an operational amplifier, and one or more feedback resistors, wherein the first circuit corresponds to a first voltage that is complementary to absolute temperature (CTAT) and the second circuit corresponds to a second voltage that is proportional to absolute temperature (PTAT); providing a temperature independent compensation to the first bandgap curve based at least in part on a bandgap device, a biasing circuit, and a resistor; providing a non-temperature compensation to the first bandgap curve based at least in part on an adjustable divider circuit; and generating a resulting bandgap curve from the first bandgap curve based at least in part on the temperature independent compensation and the non-temperature compensation, wherein the resulting bandgap curve comprises a shifted peak that occurs at a higher temperature compared to a peak of the first bandgap curve, a flatter curve compared to the first bandgap curve, or both.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present disclosure will become apparent to those skilled in the art upon consideration of the embodiment descriptions provided hereinbelow.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
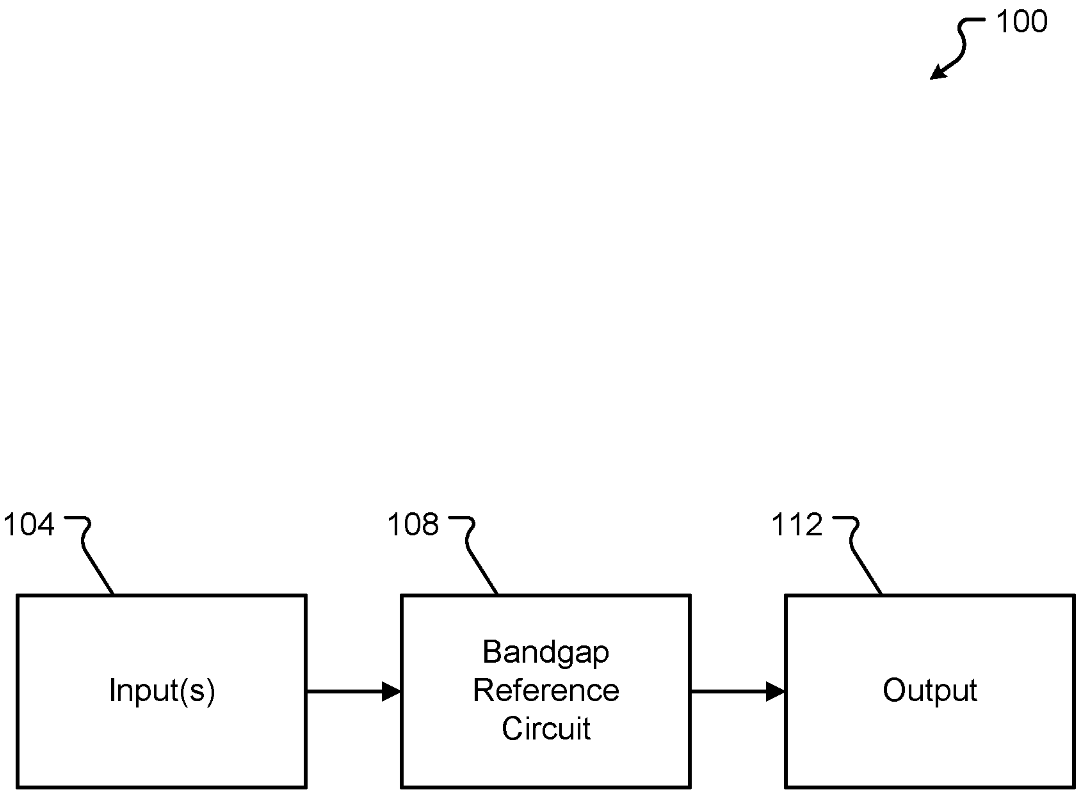
FIG. 1 is a block diagram of a system according to at least one embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Alternatively or additionally, functions may be implemented using machine learning models, neural networks, artificial neural networks, or combinations thereof (alone or in combination with instructions). Computer-readable media may include non-transitory computer-readable media, which corresponds to a tangible medium such as data storage media (e.g., random-access memory (RAM), read-only memory (ROM), electrically erasable programmable ROM (EEPROM), flash memory, or any other medium that can be used to store desired program code in the form of instructions or data structures and that can be accessed by a computer).

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Many electronic circuits (e.g., integrated circuits (ICs)) require a stable voltage reference, and in particular, a temperature stable voltage reference. For example, a stable voltage reference or a reliable constant voltage reference may be an essential component of electronic circuits that provide respective applications ranging from purely analog systems to mixed-signal systems to purely digital circuit systems. Additionally, power converters, regulators, flash memory controllers, and converters (e.g., buck converters, analog-to-digital converters (ADCs), digital-to-analog converters (DACs), etc.) are some example applications that require a voltage reference for efficient operations. Voltage reference circuits for providing constant voltage references may be provided as bandgap reference circuits that are designed to operably sum two voltages with opposite temperature slopes so as to provide the output reference voltage. The bandgap reference circuits may provide the constant voltage references regardless of power supply variations, temperature changes, or circuit loading from a device.

In some cases, the variations that are compensated for by using the bandgap reference circuits may be referred to as process, voltage, and temperature (PVT) variations. For example, the 'P' or process variations for which the bandgap reference circuits provide compensation may include deviations in a fabrication process of components in a given circuit (e.g., of which the bandgap reference circuit may be a component), such as what type of metal-oxide-semiconductor field-effect transistor (MOSFET) used (e.g., a complementary metal-oxide-semiconductor (CMOS), P-channel MOSFETs, N-channel MOSFETS, etc.), different lengths between respective parts of a metal-oxide-semiconductor (MOS) (e.g., 45 nanometers (nm), 60 nm, 90 nm, 130 nm, etc.), or other process variations. The 'V' or voltage variations for which the bandgap reference circuits provide compensation may include variations in a supply voltage that can vary from an established ideal value during day-to-day operation (e.g., variations between −10% to +20% of a rated supply voltage or a different range). The 'T' or temperature variations for which the bandgap reference circuits provide compensation may include changes in operating temperatures of a circuit and/or changes in ambient temperatures near the circuit (e.g., the bandgap reference circuits are designed to provide substantially stable or constant voltages for temperatures ranging from −40 degrees Celsius (° C.) to +125° C. or +150° C.).

As described previously, the bandgap reference circuits are designed to operably sum two voltages with opposite temperature slopes so as to provide the output reference voltage. That is, the bandgap reference circuits may provide a temperature independent voltage based on combining two phenomena that have opposite temperature coefficients (TCs). TCs may be defined as a variation of a voltage (e.g., or voltage reference) over temperature and may have units of parts per million per degree Celsius (ppm/° C.), voltage increase or decrease per degree Celsius (e.g., ±volt (V)/° C. or ±millivolt (mV)/° C.), etc. Accordingly, a reference voltage produced by a bandgap reference circuit may be considered a summation of a negative TC voltage and a positive TC voltage. In some examples, the negative TC voltage may be produced by a complementary to absolute temperature (CTAT) circuit, and the positive TC voltage may be produced by a proportional to absolute temperature (PTAT) circuit. The CTAT circuit may correspond to a voltage that decreases as temperature increases (e.g., a negative TC voltage, where voltage is inversely proportional to temperature), and the PTAT circuit may correspond to a voltage that increases as temperature increases (e.g., a positive TC voltage, where voltage is directly proportional to temperature). Subsequently, the bandgap reference circuit may include at least a CTAT circuit (or subcircuit) and a PTAT circuit (or subcircuit) that can compensate each other to produce a constant voltage regardless of how temperature changes (e.g., and other variations as described previously).

However, in some cases, the voltage of the CTAT circuit may decrease at a different rate than a rate at which the voltage of the PTAT circuit increases. In some examples, to compensate for the different rates and/or other variations between the CTAT and PTAT circuits, additional components may be added to the bandgap reference circuit, such as resistors, to adjust the TCs of either or both of the CTAT and PTAT circuits. As an example, the additional components may increase a magnitude of a positive TC voltage associated with the PTAT circuit to be substantially equal to a magnitude of a negative TC voltage associated with the CTAT circuit, such that the slopes of each voltage substantially cancel each other to result in a substantially constant voltage at an output of the bandgap reference circuit. In some examples and as described herein, the bandgap reference circuit may include an operational amplifier (e.g., op amp) that sums a voltage from the CTAT circuit and a voltage of the PTAT circuit to produce the substantially constant voltage. Additionally or alternatively, a bandgap reference circuit may include other components that are used for summing opposing voltages from a CTAT circuit and a PTAT circuit (e.g., such as a current mirror, a plurality of diodes, or other components not explicitly listed herein).

In some cases, the substantially constant voltage produced by a bandgap reference circuit may be represented by a parabolic or quadratic curve that opens downward (e.g., an inverted U-shaped curve). That is, the substantially constant voltage may vary as temperature increases but on a small magnitude (e.g., the substantially constant voltage may vary by about 2-3 millivolts (mV) depending on the temperature). As described herein, a curvature for the substantially constant voltage produced by the bandgap reference circuit may be referred to as a bandgap curvature. In some cases, the bandgap curvature may reflect a quadratic curve based on different TCs of various components in the bandgap reference circuit for which compensations have not been added or addressed. For example, the CTAT circuit and/or the PTAT circuit may include transistors (e.g., bipolar junction transistors (BJTs)) that include negative TC voltages that cause the substantially constant voltage to vary with temperature changes.

As an example, a bandgap equation may be represented by the set of equations (1) as given below. The bandgap equation may assume that two (2) identical transistors are used in the bandgap reference circuit (e.g., one transistor in each of a CTAT circuit/subcircuit and a PTAT circuit/subcircuit of the bandgap reference circuit). Based on the identical transistors, a current through a first transistor ($I_{s1}$) may be equal to a current through a second transistor ($I_{s2}$) (e.g., $I_{s1}=I_{s2}$) biased at $nI_0$ and $I_0$, respectively, where $I_0$ represents a rated current for the transistors and n represents a temperature constant for the transistors. Subsequently, a difference in voltage across each transistor (e.g., measured across a base and emitter of each transistor, such that the voltage is given by $V_{BE1}$ for the first transistor and by $V_{BE2}$ for the second transistor) may be calculated based on the set of equations (1) given below, where the difference in voltage is represented by $\Delta V_{BE}$:

$$\begin{aligned}\Delta V_{BE} &= V_{BE1} - V_{BE2} \\ &= V_T \ln\left(nI_0/I_{s1}\right) - V_T \ln\left(I_0/I_{s2}\right) \\ &= V_T \ln(n)\end{aligned} \tag{1}$$

$V_T$ may represent a thermal voltage that is calculated based on equation (2) given below:

$$V_T = \frac{kT}{q} \tag{2}$$

where k represents the Boltzmann constant (e.g., $1.380649\times10^{-23}$ Joules (J)/Kelvin (K) or $8.617333262145\times10^{-5}$ electronvolts (eV)/K), T represents a given temperature (e.g., in K), and q represents the charge of an electron (e.g., $1.602176634\times10^{-19}$ coulombs (C)). Subsequently, based on the set of equations (1) and the equation (2), a TC for $V_{BE}$ may be given by equation (3) below:

$$\delta\Delta V_{BE}/\delta T = \frac{k}{q}(\ln(n)) \tag{3}$$

With regards to equations (1) and (3) above, the bandgap curvature corresponding to the substantially constant voltage produced by the bandgap reference circuit may reflect a quadratic curve, as described previously, with a high TC in ppm. Accordingly, the bandgap curvature may need to be compensated in order to get a smaller TC. For examples, a current flowing through the transistors (e.g., BJTs) may decrease due to a TC of the transistors of −2 mV/° C., which is not compensated resulting in an inverted U-shaped curve for the bandgap curvature. For example, if compensation is not included in the bandgap reference circuit for the negative TC of the transistors, a typical bandgap reference circuit may include a TC of about 20 ppm/° C.

As described herein, a bandgap reference circuit is provided that includes compensations for the bandgap curvature to reduce variations (e.g., reduce a TC of the bandgap reference circuit) in a substantially constant voltage generated by the bandgap reference circuit (e.g., $V_{ref}$ may be used herein to reference the substantially constant voltage generated). For example, the bandgap reference circuit provided and described herein may include an additional transistor (e.g., an additional bandgap device) that is temperature dependent to produce a second bandgap curve (e.g., in addition to a first bandgap curve that is conventionally produced in a typical bandgap reference circuit via a CTAT circuit and PTAT circuit). In some examples, the bandgap reference circuit may include an adjustable resistor or a fixed-value resistor that, in part, controls curvature of the bandgap curvature. Additionally, the bandgap reference circuit may include a biasing circuit or subcircuit that adjusts a peak of the second bandgap curve to generate an optimum point with a low TC in ppm. In some examples, the biasing circuit/subcircuit may be considered substantially temperature-independent, such that the biasing circuit/subcircuit provides a temperature independent compensation to adjust the bandgap curvature.

The additional transistor may conditionally conduct current in the bandgap reference circuit if a voltage across a base and emitter of the additional transistor (e.g., when multiplied by (2) or added to another transistor voltage) is less than a voltage associated with the biasing circuit/subcircuit, if a certain temperature is met during operation of the bandgap reference circuit, or both. When current flows through the additional transistor, an additional current path is provided in the bandgap reference circuit, such that an original bandgap curve (e.g., the first bandgap curve that is conventionally produced in a typical bandgap reference circuit via a CTAT circuit and PTAT circuit) is shifted to the right to have a peak at a higher temperature than the original bandgap curve. That is, the additional transistor may provide a shifted bandgap curve. In some examples, the current flowing through the additional transistor may flatten the bandgap curvature. Additionally, the adjustable or fixed-value resistor may control and balance how much current flows through a CTAT circuit (e.g., a transistor of the CTAT circuit) and the additional transistor, which affects a curvature of the second bandgap curve and/or a peak of the second bandgap curve.

By implementing the additional transistor, the biasing circuit/subcircuit, and the adjustable or fixed-value resistor into the bandgap reference circuit, an original bandgap curve may be modified to bend back upwards instead of falling down, which results in a lower temperature coefficient in ppm for the bandgap reference circuit (e.g., about 10 ppm/° C. compared to about 20 ppm/° C. for a typical bandgap reference circuit). In some examples, the bandgap reference circuit described herein may have a higher order than a conventional bandgap reference circuit that does not include the additional transistor, the biasing circuit/subcircuit, and/or the adjustable or fixed-value resistor.

Additionally, in some examples, the bandgap reference circuit provided and described herein may also include an adjustable divider circuit or subcircuit. The adjustable divider circuit/subcircuit may comprise a first resistor and a second resistor, where the second resistor is an adjustable or variable resistor that can be adjusted to have a resistance value between 0-5% of a fixed resistance value for the first resistor. The adjustable divider circuit/subcircuit may be included in the bandgap reference circuit to adjust a level of a bandgap for the bandgap reference circuit (e.g., to adjust a value of the substantially constant voltage generated by the bandgap reference circuit) but not to adjust a curvature of the bandgap curvature. For example, the adjustable divider circuit/subcircuit may be used to vary the substantially constant voltage generated by the bandgap reference circuit within a state range while still maintaining a same bandgap curvature.

In some examples, the adjustable divider circuit/subcircuit may be considered temperature-independent based on being coupled or connected to an output of the bandgap reference circuit (e.g., the substantially constant voltage that is generated by the bandgap reference circuit). Additionally or alternatively, the second resistor of the adjustable divider circuit/subcircuit (e.g., the adjustable or variable resistor) may be susceptible to temperature effects (e.g., a resistance value of the second resistor changes with temperature changes), but the temperature effects may only affect the resistance of the second resistor by less than 5%. Accordingly, the adjustable divider circuit/subcircuit may be considered to be providing non-temperature curvature adjustments (e.g., a non-temperature compensation) for the bandgap curvature of the substantially constant voltage generated by the bandgap reference circuit described herein, and the additional transistor and biasing circuit/subcircuit described previously may provide a temperature independent compensation for the bandgap curvature.

In some examples, the biasing circuit/subcircuit described herein may include a temperature independent voltage source ($V_{bias}$), a transistor (e.g., a BJT), and a resistor. The temperature independent voltage source may produce a fixed and adjustable voltage (e.g., 1.25 V) that is coupled or connected to a base of the transistor to provide a fixed voltage source to the transistor. Additionally or alternatively, the biasing circuit/subcircuit may include a transistor and resistor (e.g., no specific temperature independent voltage source is included), where a base of the transistor is coupled or connected directly to an output of the bandgap reference circuit. The output of the bandgap reference circuit may comprise the substantially constant voltage (e.g., $V_{ref}$), which behaves like an independent voltage source and/or fixed voltage source for the transistor. Additionally or alternatively, if the biasing circuit/subcircuit does not include the temperature independent voltage source, the bandgap reference circuit may include an adjustable current source and an additional resistor, where the adjustable current source is coupled or connected to the base of the transistor of the biasing circuit/subcircuit. The adjustable current source may provide a positive or negative current (e.g., referenced or given by $I_{adjust}$) and may be used to adjust a base voltage of the transistor of the biasing circuit/subcircuit and/or to adjust the substantially constant voltage (e.g., $V_{ref}$) at the output of the bandgap reference circuit (e.g., $V_{ref}$ becomes dependent on $I_{adjust}$).

Embodiments of the present disclosure provide technical solutions to one or more of the problems of (1) high TCs in bandgap reference circuits, (2) providing compensations in bandgap reference circuits for negative TCs associated with components in the bandgap reference circuits, and (3) providing a more substantially constant voltage at an output of bandgap reference circuits (e.g., less variability in the substantially constant voltage).

Turning first to FIG. 1, a block diagram of a system 100 according to at least one embodiment of the present disclosure is shown. The system 100 may be used to provide a substantially constant voltage and/or current regardless of varying inputs. For example, one or more inputs 104 may be fed into a bandgap reference circuit 108, where an output 112 of the bandgap reference circuit 108 is substantially constant regardless of the values of the one or more inputs 104.

The bandgap reference circuit 108 may be designed to produce the substantially constant value for the output 112 regardless of power supply variations, temperature changes, or circuit loading from a device (e.g., the inputs 104). For example, the bandgap reference circuit 108 may generate the substantially constant value for the output 112 for different PVT variations as described previously. As described herein, the bandgap reference circuit 108 may generate a substantially constant voltage for the output 112. The substantially constant voltage of the output 112 may be useful for various electronic circuits, ICs, and/or applications. For example, the substantially constant voltage may be used for power converters, regulators, flash memory controllers, converters (e.g., buck converters, ADCs, DACs, etc.), or other applications not explicitly listed herein.

In some cases, a typical configuration for the bandgap reference circuit 108 may include at least a CTAT circuit/subcircuit and a PTAT circuit/subcircuit. The CTAT circuit may correspond to a voltage (e.g., a first voltage) that decreases as temperature increases (e.g., a negative TC voltage, where voltage is inversely proportional to temperature), and the PTAT circuit may correspond to a voltage (e.g., a second voltage) that increases as temperature increases (e.g., a positive TC voltage, where voltage is directly proportional to temperature). Subsequently, the bandgap reference circuit 108 may combine voltage outputs of the CTAT circuit and the PTAT circuit to produce a substantially constant voltage regardless of how temperature changes (e.g., and other variations as described previously). In some examples, the bandgap reference circuit 108 may include an operational amplifier (e.g., op amp) that sums a voltage from the CTAT circuit and a voltage of the PTAT circuit to produce the substantially constant voltage. Additionally or alternatively, the bandgap reference circuit 108 may include other components that are used for summing opposing voltages from a CTAT circuit and a PTAT circuit (e.g., such as a current mirror, a plurality of diodes, or other components not explicitly listed herein).

However, as described previously, the voltage of the CTAT circuit may decrease at a different rate than a rate at which the voltage of the PTAT circuit increases, such that additional components may be added to the bandgap reference circuit 108, such as resistors, to adjust the TCs of either or both of the CTAT and PTAT circuits. Additionally, the CTAT circuit and/or the PTAT circuit may include transistors (e.g., BJTs) that include negative TC voltages that cause the substantially constant voltage to vary with temperature changes. Accordingly, a configuration for the bandgap reference circuit 108 is provided herein and described in greater detail with reference to FIG. 2 that includes compensations for a bandgap curvature to reduce variations (e.g., reduce a TC of the bandgap reference circuit 108) in the substantially constant voltage generated by the bandgap reference circuit 108.

The system 100 or similar systems may be used, for example, to carry out one or more aspects of any of the method 1100 described herein. The system 100 or similar systems may also be used for other purposes.

Figure 2:
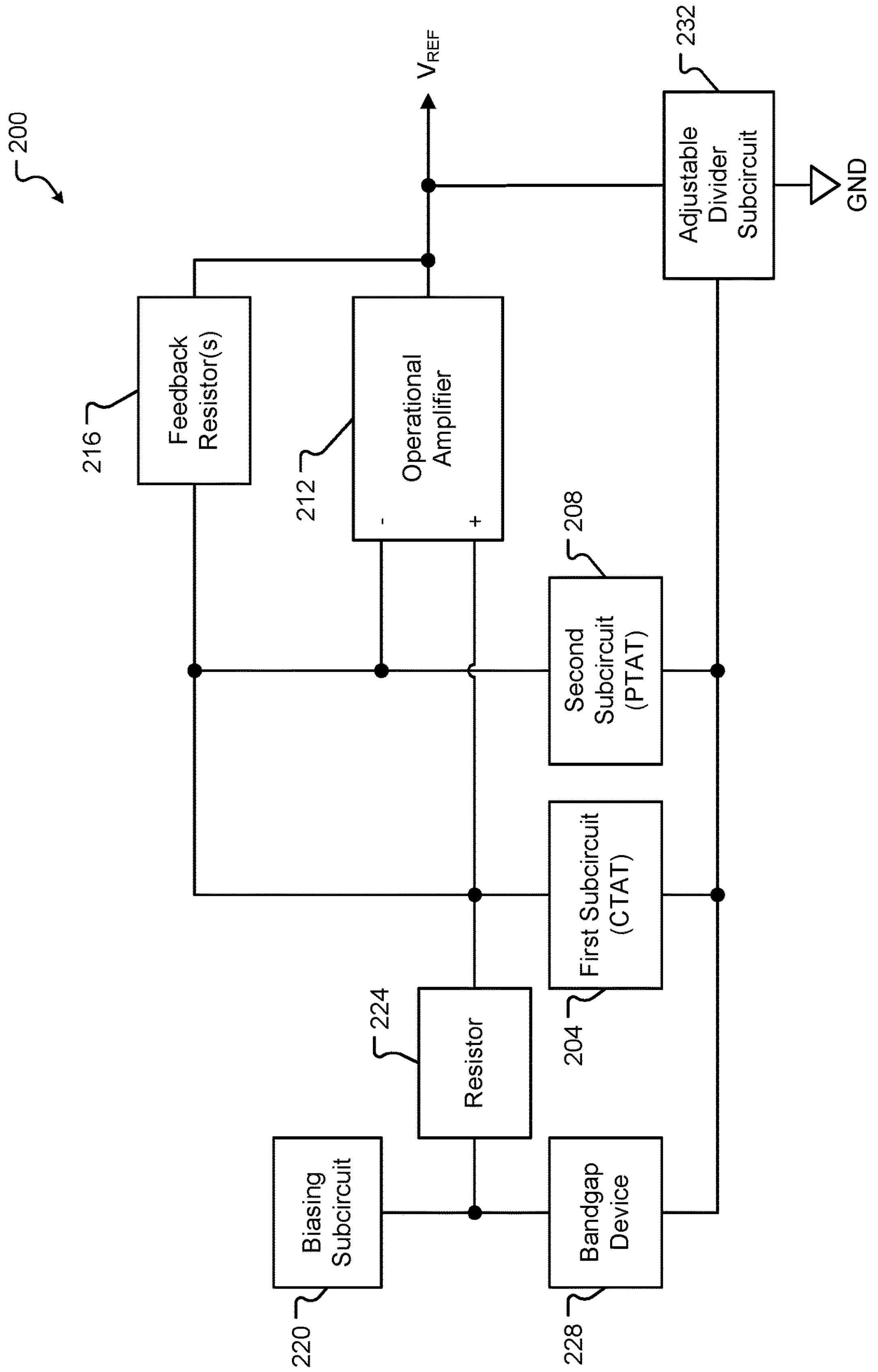
FIG. 2 is a block diagram of a circuit according to at least one embodiment of the present disclosure.

FIG. 2 depicts a block diagram of a circuit 200 according to at least one embodiment of the present disclosure. The circuit 200 may implement or may be implemented by aspects of the system 100 as described previously with reference to FIG. 1. For example, the circuit 200 may represent an example of a bandgap reference circuit 108 as described with reference to FIG. 1.

The circuit 200 may include a first subcircuit 204 that corresponds to a first voltage that is CTAT, a second subcircuit 208 that corresponds to a second voltage that is PTAT, and an operational amplifier 212 that receives the first voltage of the first subcircuit 204 and the second voltage of the second subcircuit 208. Subsequently, a reference voltage ($V_{ref}$) may be produced at an output of the operational amplifier 212 based on the first voltage and the second voltage. In some examples, a value of the reference voltage may be considered to be substantially constant based on the slopes of each voltage cancelling each other (at least partially).

Additionally, the circuit 200 may include one or more feedback resistors 216 that are coupled to the output of the operational amplifier 212, the first subcircuit 204, and the second subcircuit 208. In some examples, the one or more feedback resistors 216 may be included in the circuit 200 to adjust TCs of either or both of the first subcircuit 204 and the second subcircuit 208. For example, the one or more feedback resistors 216 may increase a magnitude of a positive TC voltage associated with the second subcircuit 208 (e.g., PTAT circuit) to be substantially equal to a magnitude of a negative TC voltage associated with the first subcircuit 204 (e.g., CTAT circuit), such that the slopes of each voltage substantially cancel each other to result in a substantially constant voltage for the reference voltage. In some examples, the first subcircuit 204 and the second subcircuit 208 may at least each include respective transistors (e.g., BJTs) that include a negative TC, which may cause the reference voltage to vary based on temperature (e.g., the substantially constant voltage may vary by about 2-3 mV depending on the temperature).

Accordingly, as described herein, to provide compensation for the negative TC(s) of components in the circuit 200, the circuit 200 may further include a biasing subcircuit 220, a resistor 224, a bandgap device 228, and an adjustable divider subcircuit 232. In some examples and as shown, the biasing subcircuit 220 may be coupled to the first subcircuit 204 via the resistor 224, the resistor 224 may be coupled to the biasing subcircuit 220 and the first subcircuit 204, the bandgap device 228 may be coupled to the biasing subcircuit 220 and the resistor 224, and the adjustable divider subcircuit 232 may be coupled to the output of the operational amplifier 212, the first subcircuit 204, the second subcircuit 208, and the bandgap device 228.

The biasing subcircuit 220 may be considered as substantially temperature independent and may provide adjustments to a curvature of the reference voltage. The resistor 224 may, in part, control the curvature of the reference voltage. The bandgap device 228 may provide an alternate path for current to flow in the circuit 200 via the resistor 224. Additionally, the bandgap device 228 may, in part, flatten the curvature of the reference voltage. The adjustable divider subcircuit 232 may provide non-temperature adjustments to the curvature of the reference voltage.

Based on the biasing subcircuit 220, the resistor 224, the bandgap device 228, and the adjustable divider subcircuit 232, the reference voltage produced at the output of the operational amplifier 212 may comprise a temperature independent compensation and a non-temperature compensation. For example, the temperature independent compensation may be applied to the reference voltage based on the bandgap device 228, the resistor 224, and the biasing subcircuit 220, and the non-temperature compensation may be applied to the reference voltage based on the adjustable divider subcircuit 232. The circuit 200 is described in greater detail with reference to FIG. 3.

The circuit 200 or similar circuits/systems may be used, for example, to carry out one or more aspects of any of the method 1100 described herein. The circuit 200 or similar circuits and systems may also be used for other purposes.

Figure 3:
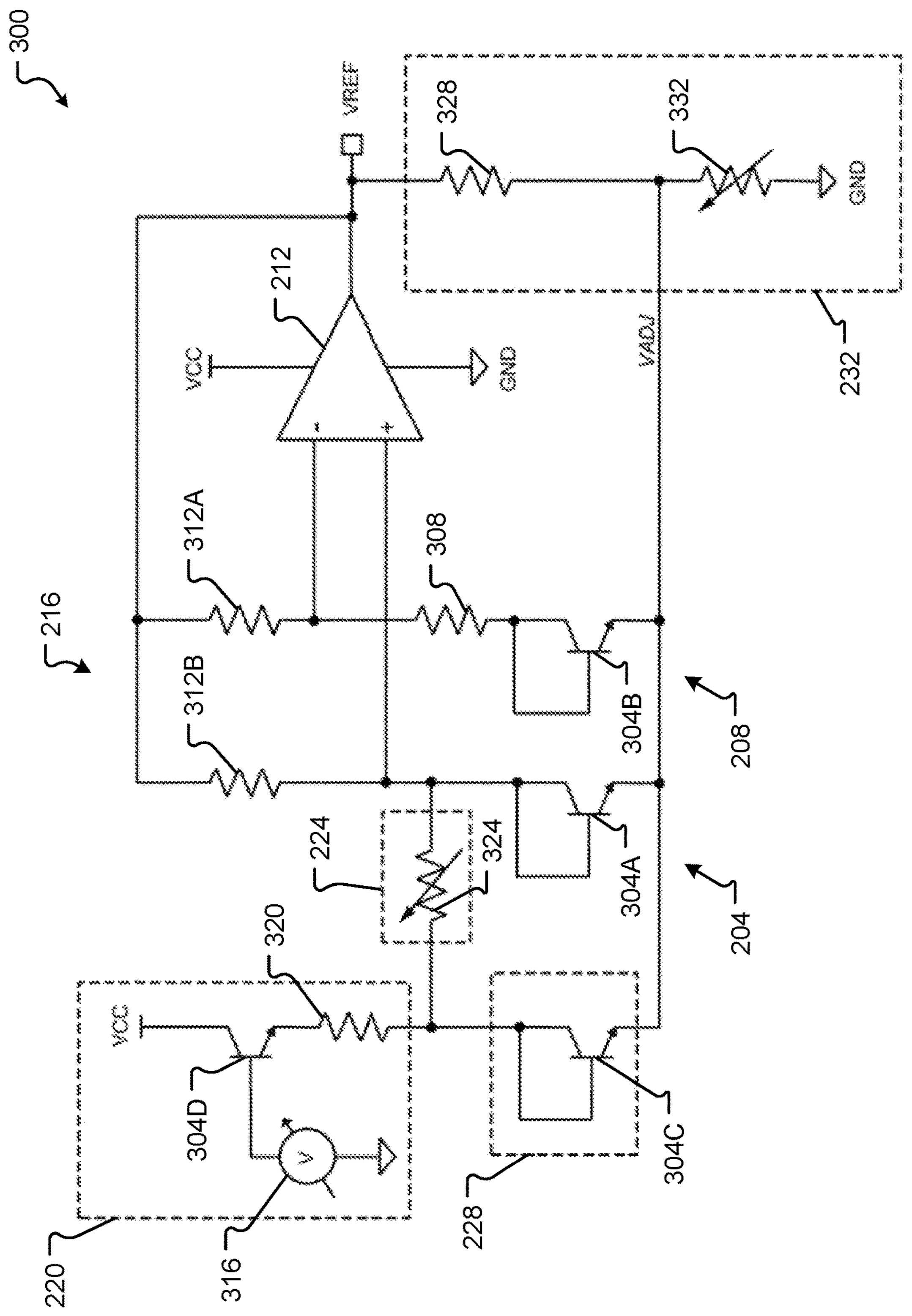
FIG. 3 is a bandgap reference circuit according to at least one embodiment of the present disclosure.

FIG. 3 depicts a bandgap reference circuit 300 according to at least one embodiment of the present disclosure. The bandgap reference circuit 300 may implement or may be implemented by aspects of the system 100 as described previously with reference to FIG. 1 and the circuit 200 as described previously with reference to FIG. 2. In some examples, the bandgap reference circuit 300 may represent a more detailed configuration of the circuit 200 as described with reference to FIG. 2. For example, the bandgap reference circuit 300 may include the first subcircuit 204, the second subcircuit 208, the operational amplifier 212, the one or more feedback resistors 216, the biasing subcircuit 220, the resistor 224, the bandgap device 228, and the adjustable divider subcircuit 232 as described with reference to FIG. 2. As described herein, the bandgap reference circuit 300 may be used to provide curvature adjustment(s) for a bandgap curve to produce a substantially constant voltage that has a lower TC compared to previously designed bandgap reference circuits.

In some examples, the first subcircuit 204 may include a first transistor 304A (Q1), and the second subcircuit 208 may include a second transistor 304B (Q2) and a resistor 308 (R2). In some examples, the first subcircuit 204 may be considered a CTAT circuit or subcircuit, and the second subcircuit 208 may be considered a PTAT circuit or subcircuit. The one or more feedback resistors 216 may include a first resistor 312A (R1) coupled to the second subcircuit 208 and a second resistor 312B (R3) coupled to the first subcircuit 204. The bandgap device 228 may include a third transistor 304C (Q3), and the biasing subcircuit 220 may include a fourth transistor 304D (Q4), a temperature independent voltage source 316, and an additional resistor 320 (R5). In some examples, the temperature independent voltage source may be adjustable to adjust a peak of a bandgap curve associated with the bandgap device 228. For example, adjusting the peak of the bandgap curve may lower a TC of the bandgap reference circuit 300.

In some examples, a base of the fourth transistor 304D may be coupled to the temperature independent voltage source 316, and the additional resistor 320 may be coupled to an emitter of the fourth transistor 304D, where an opposing end of the additional resistor 320 is coupled to the resistor 224 and the bandgap device 228 (e.g., the third transistor 304C). In some examples, the temperature independent voltage source 316 may be adjustable to adjust a peak of a bandgap curve associated with the bandgap device 228. Additionally, adjusting the peak of the bandgap curve associated with the bandgap device 228 may lower a TC of the bandgap reference circuit 300. In some examples, the temperature independent voltage source 316 may be set to 1.25 V.

The resistor 224 may include a resistor 324 (R4). In some examples, the resistor 324 may control and balance a current flowing through the biasing subcircuit 220 and the bandgap device 228. Additionally, the bandgap device 228 may conditionally conduct current in the bandgap reference circuit 300. For example, the bandgap device 228 may conduct current in the bandgap reference circuit 300 when a voltage across a base and an emitter of the third transistor 304C (e.g., when multiplied by two (2) or added to a voltage across a base and emitter of the fourth transistor 304D) is less than a voltage associated with the biasing subcircuit 220. Additionally or alternatively, the bandgap device 228 may conduct current in the bandgap reference circuit 300 when a temperature of the bandgap reference circuit 300 is greater than or equal to a threshold value and/or a temperature of an environment surrounding the bandgap reference circuit 300 is greater than or equal to the threshold value. In some examples, the resistor 324 may be a variable resistor that has an adjustable resistance value to control how much current flows through the first subcircuit 204 and the bandgap device 228 (e.g., how much current flows through either of the first transistor 304A and the third transistor 304C). Additionally or alternatively, the resistor 324 may be a fixed resistor that has a fixed resistance value, which controls a constant amount of current to flow through the biasing subcircuit 220 and the bandgap device 228.

In some examples, the first subcircuit 204 and the second subcircuit 208 may produce a first bandgap curve via the operational amplifier 212 (e.g., along with the one or more feedback resistors 216). For example, the first bandgap curve produced by the first subcircuit 204 and the second subcircuit 208, as described herein, may represent an uncompensated bandgap curve (e.g., a bandgap curve before effects of the biasing subcircuit 220, the resistor 224, the bandgap device 228, and/or the adjustable divider subcircuit 232 are applied to the bandgap reference circuit 300). Subsequently, when current is flowing through the bandgap device 228, the bandgap device 228 may produce an additional bandgap curve such that, when the additional bandgap curve is applied to the first bandgap curve, a resulting bandgap curve is produced that comprises an adjusted version of the first bandgap curve. For example, the resulting bandgap curve may include a shifted peak that occurs at a higher temperature compared to a peak of the first bandgap curve. Additionally or alternatively, the resulting bandgap may include a flatter curve compared to the first bandgap curve. As such, the bandgap device 228 may be considered to provide a shifted bandgap curve (e.g., compared to the first bandgap curve produced without the effects of the bandgap device 228 being applied).

In some examples, the adjustable divider subcircuit 232 may include a first resistor 328 (R6) and a second resistor 332 (R7). For example, the first resistor 328 may be coupled or connected to the output of the operational amplifier 212 (e.g., $V_{ref}$), the bandgap device 228, the first subcircuit 204, and the second subcircuit 208. The second resistor 332 may be coupled to the first resistor 328, the bandgap device 228, the first subcircuit 204, and the second subcircuit 208. In some examples, the second resistor 332 may have a resistance value much smaller than a resistance value for the first resistor 328 (e.g., R7<<R6). For example, the second resistor 332 may be a variable resistor that is adjustable to resistance values between 0-5% of a resistance value for the first resistor 328. Additionally or alternatively, the second resistor 332 may be non-programmable (e.g., the second resistor 332 has a fixed resistance value).

In some examples, the second resistor 332 may be susceptible to temperature effects (e.g., a resistance value for the second resistor 332 may change or be affected based on temperature changes). For example, one node to which the second resistor 332 is coupled or connected may be temperature dependent, such as the node that is coupled to the first subcircuit 204, the second subcircuit 208, and the bandgap device 228, which may be referred to as $V_{adj}$, resulting in the second resistor 332 being considered to be temperature dependent as well. However, changes in temperature may affect resistance values of the second resistor 332 by 5% or less. That is, the resistance value set or configured for the second resistor 332 may change by ±5% as the temperature changes. For example, a resistance value for the second resistor 332 may be affected by a magnitude of 5% or less based on a temperature of the bandgap reference circuit 300 changing or a temperature of a surrounding environment changing. The adjustable divider subcircuit 232 may be considered temperature independent based on the first resistor 328 being coupled to $V_{ref}$, even though the second resistor 332 is coupled to the temperature dependent $V_{adj}$.

As described previously, the adjustable divider subcircuit 232 may provide non-temperature curvature adjustments for applying minor adjustments to a bandgap curve for the reference voltage generated by the bandgap reference circuit 300. In some examples, the adjustable divider subcircuit 232 may be considered temperature-independent based on being connected to $V_{ref}$ at the output of the operational amplifier 212. For example, the output of the operational amplifier 212 (e.g., and the bandgap reference circuit 300 as a whole) may be designed to be temperature-independent (e.g., $V_{ref}$ is substantially constant regardless of temperature changes, among other variations as described previously). As such, the adjustable divider subcircuit 232 may also be considered temperature-independent based on being coupled with or connected to the temperature-independent output of the bandgap reference circuit 300 (e.g., $V_{ref}$).

As described herein, the bandgap device 228 (e.g., comprising the third transistor 304C), which is temperature dependent, may be included in the bandgap reference circuit 300 to produce a second bandgap curve (e.g., in addition to a first bandgap curve produced, in part, by the first subcircuit 204 and the second subcircuit 208). Additionally, the resistor 224 (e.g., comprising the resistor 324, such as an adjustable/variable resistor or a fixed resistor) may be included in the bandgap reference circuit 300 to control curvature of the second bandgap curve produced by the bandgap device 228 and/or to control curvature of a final, compensated bandgap curve generated from the bandgap reference circuit 300. The biasing subcircuit 220 may also be added to or included in the bandgap reference circuit 300 to further provide adjustments to the second bandgap curve produced by the bandgap device 228 and/or the final, compensated bandgap curve generated from the bandgap reference circuit 300.

As shown in the example of FIG. 2 and described previously, the biasing subcircuit 220 may include the fourth transistor 304D (Q4), the temperature independent voltage source 316, and the additional resistor 320 (R5), where the temperature independent voltage source 316 (e.g., a direct current (DC) voltage source) to the base of the fourth transistor 304D. In some examples, the voltage generated by the temperature independent voltage source 316 may be referred to as $V_{bias}$. Additionally, $V_{bias}$ may be set to 1.25 V (e.g., $V_{bias}$=1.25 V). Additionally or alternatively, the temperature independent voltage source 316 may be adjustable to generate different voltages other than 1.25 V.

In some examples, the bandgap device 228 may conditionally conduct current in the bandgap reference circuit 300 based in part on a voltage measured across the base and emitter of the third transistor 304C, where the voltage is referred to as $V_{be}$. For example, the bandgap device 228 may conduct current if $2V_{be}<V_{bias}$. In some examples, the $2V_{be}$ variable may represent the voltage measured across the base and emitter of the third transistor 304C multiplied by two (2) (e.g., $2V_{be}=2*V_{beQ3}$) or may represent the voltage measured across the base and emitter of the third transistor 304C added to a voltage measured across the base and emitter of the fourth transistor 304D (e.g., $2V_{be}=V_{beQ3}+V_{beQ4}$).

At certain temperatures, the $2V_{be}$ variable may be less than $V_{bias}$. For example, at −40° C., the $2V_{be}$ variable may be approximately equal to 1.4 V or another value less than $V_{bias}$ (e.g., $2V_{be}$ (≈1.4V)>1.25V@−40° C.). When $2V_{be}$ is less than $V_{bias}$, no current may flow to the biasing subcircuit 220 and/or the bandgap device 228, such that the biasing subcircuit 220 and the bandgap device 228 may be considered an open circuit. In some examples, the third transistor 304C and the fourth transistor 304D may be considered temperature dependent. For example, $V_{be}$ (e.g., voltage measured across base and emitter of either transistor) may decrease by a TC of −2 mV/° C. Accordingly, at a certain temperature (e.g., a temperature of the bandgap reference circuit 300 and/or a temperature of a surrounding environment is greater than or equal to a threshold value), the third transistor 304C may begin to conduct current in the bandgap reference circuit 300 based on $V_{be}$ of the third transistor 304C (and the fourth transistor 304D) decreasing as temperature increases, such that $2V_{be}$ becomes less than $V_{bias}$. For example, a sum of $V_{be}$ for the third transistor 304C and the fourth transistor 304D (e.g., $V_{beQ3}+V_{beQ4}$) may decrease with increasing temperature (e.g., such that $2V_{be}\leq 1.25$V), and, as such, current may begin flowing through the third transistor 304C, the fourth transistor 304D, and the additional resistor 320. That is, at or above certain temperatures, the biasing subcircuit 220 and the bandgap device 228 may comprise a closed circuit or closed subcircuit within the bandgap reference circuit 300. A current response for the third transistor 304C as temperature increases is shown and described in greater detail with reference to FIG. 4.

With the additional current path through the biasing subcircuit 220 and the bandgap device 228 when the bandgap device 228 conduct currents in the bandgap reference circuit 300 as described, an original bandgap curve generated, in part, by the first subcircuit 204 and the second subcircuit 208 may be shifted to the right with a peak value occurring at a higher temperature. A corresponding bandgap curve that has been shifted based in part on current flowing through the biasing subcircuit 220 and the bandgap device 228 is shown and described in greater detail with reference to FIG. 5A. Additionally, by having the biasing subcircuit 220 be adjustable (e.g., via adjusting a voltage of the temperature independent voltage source 316), the peak of the shifted bandgap curve may be adjusted to get an optimum point with a lowest TC in ppm for the bandgap reference circuit 300. Effects of adjusting the biasing subcircuit 220 are shown and described in greater detail with reference to FIG. 5B. The resistor 224 may control and balance the current flowing through the first subcircuit 204 and the bandgap device 228 (e.g., through the first transistor 304A and the third transistor 304C), which affects curvature of a second peak of the bandgap curve produced by the bandgap reference circuit 300 as well.

By implementing the biasing subcircuit 220, the resistor 224, the bandgap device 228, and the adjustable divider subcircuit 232, an original bandgap curve (e.g., produced, in part, by the first subcircuit 204 and the second subcircuit 208) may be modified or adjusted, such that a resulting bandgap curve is generated that bends back upwards instead of falling down, resulting in a lower TC in ppm for the bandgap reference circuit 300. Additionally, the resulting bandgap curve may have a higher order than the original bandgap curve (e.g., additional factors/functions, such as additional compensations as described herein, are used to generate the resulting bandgap curves). For example, the resulting bandgap curve produced by the bandgap reference circuit 300 may include a temperature independent compensation and a non-temperature compensation not taken into account for the original bandgap curve. For example, the temperature independent compensation may be applied to the resulting bandgap curve based on the bandgap device 228, the resistor 224, and the biasing subcircuit 220, and the non-temperature compensation may be applied to the resulting bandgap curve based on the adjustable divider subcircuit 232.

The bandgap reference circuit 300 or similar circuits/systems may be used, for example, to carry out one or more aspects of any of the method 1100 described herein. The bandgap reference circuit 300 or similar circuits and systems may also be used for other purposes.

Figure 4:
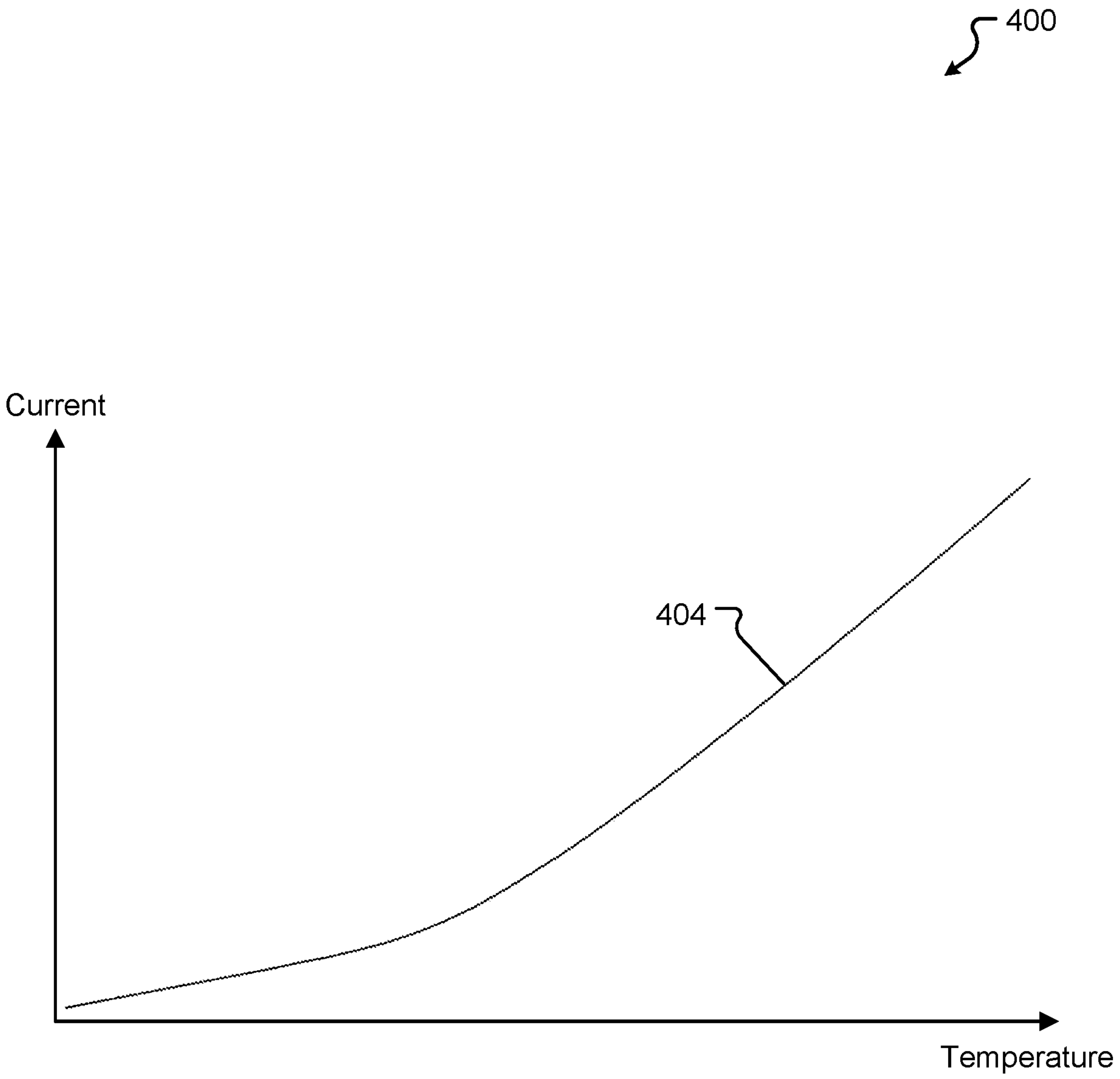
FIG. 4 is a current response graph according to at least one embodiment of the present disclosure.

FIG. 4 depicts a current response graph 400 according to at least one embodiment of the present disclosure. The current response graph 400 may implement or may be implemented by aspects of the system 100, the circuit 200, and the bandgap reference circuit 300 as described previously with reference to FIGS. 1-3. For example, the current response graph 400 may represent how current flows through a given transistor as temperature increases, where the transistor is represented by the bandgap device 228 and/or the third transistor 304C as described with reference to FIGS. 2 and 3.

As described previously, at a certain temperature, the third transistor 304C may begin to conduct current in a bandgap reference circuit. For the third transistor 304C to being to conduct current, one or more equations may be satisfied. The one or more equations are given below:

$$V_{bias}-V_{beQ4}-I_{Q3}*R5-V_{beQ3}=0 \quad (4)$$

$$I_{Q3}*R5=V_{bias}-V_{beQ4}-V_{beQ3} \quad (5)$$

$$I_{Q3}=(V_{bias}-V_{beQ4}-V_{beQ3})/R5 \quad (6)$$

$V_{bias}$ represents a voltage generated and output by the temperature independent voltage source 316 as described with reference to FIG. 3, $V_{beQ3}$ represents a voltage measured across the third transistor 304C as described with reference to FIG. 3, $V_{beQ4}$ represents a voltage measured across the fourth transistor 304D as described with reference to FIG. 3, $I_{Q3}$ represents a current that flows through the third transistor 304C, and R5 represents a resistance value of the additional resistor 320 as described with reference to FIG. 3, where $I_{Q3}$*R5 represents a voltage drop across the additional resistor 320.

Based on the equations (4), (5), and (6), a curve 404 is generated that represents how current flows through the third transistor 304C as temperature changes. As shown with the example of the curve 404, the third transistor 304C may start to conduct current at or above a certain temperature (e.g., greater than or equal to a temperature threshold value). In some examples, the temperature at which the third transistor 304C begins to conduct current may correspond to the condition that $2V_{be}<V_{bias}$ as described with reference to FIG. 3.

Figure 5A:
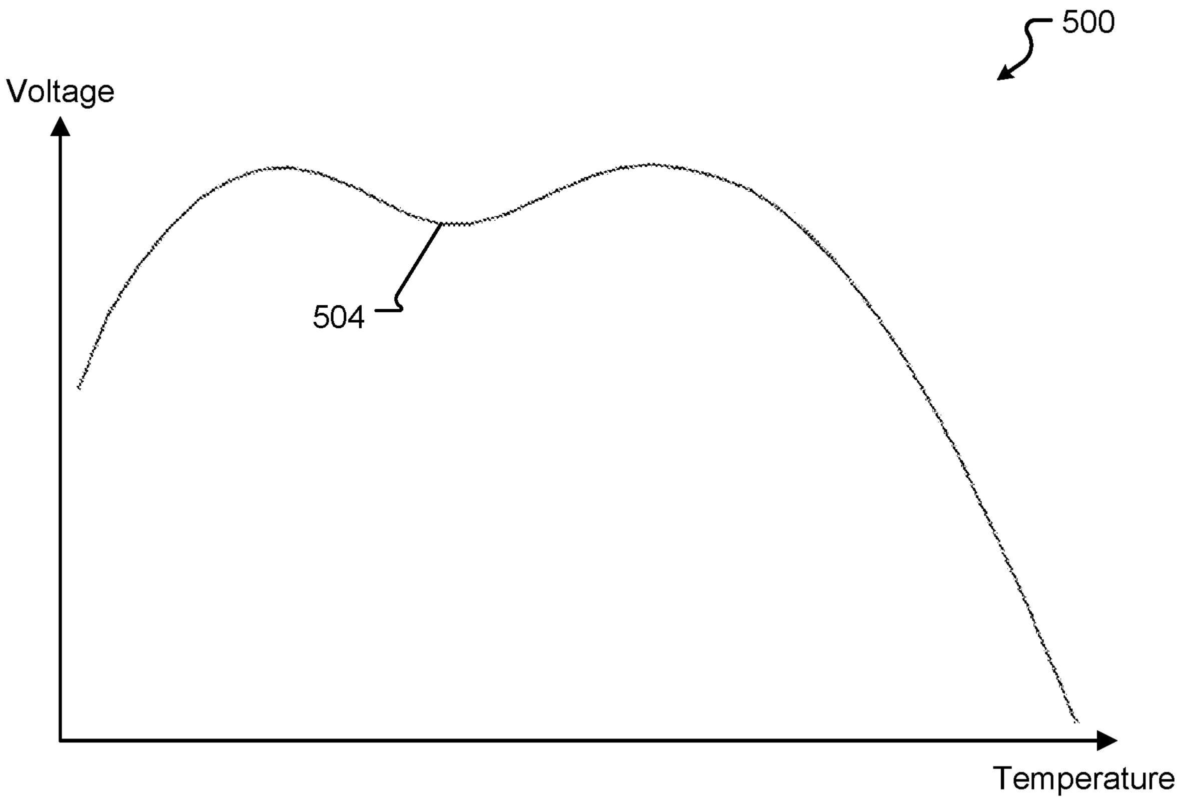
FIGS. 5A and 5B are bandgap curvatures according to at least one embodiment of the present disclosure.
Figure 5B:
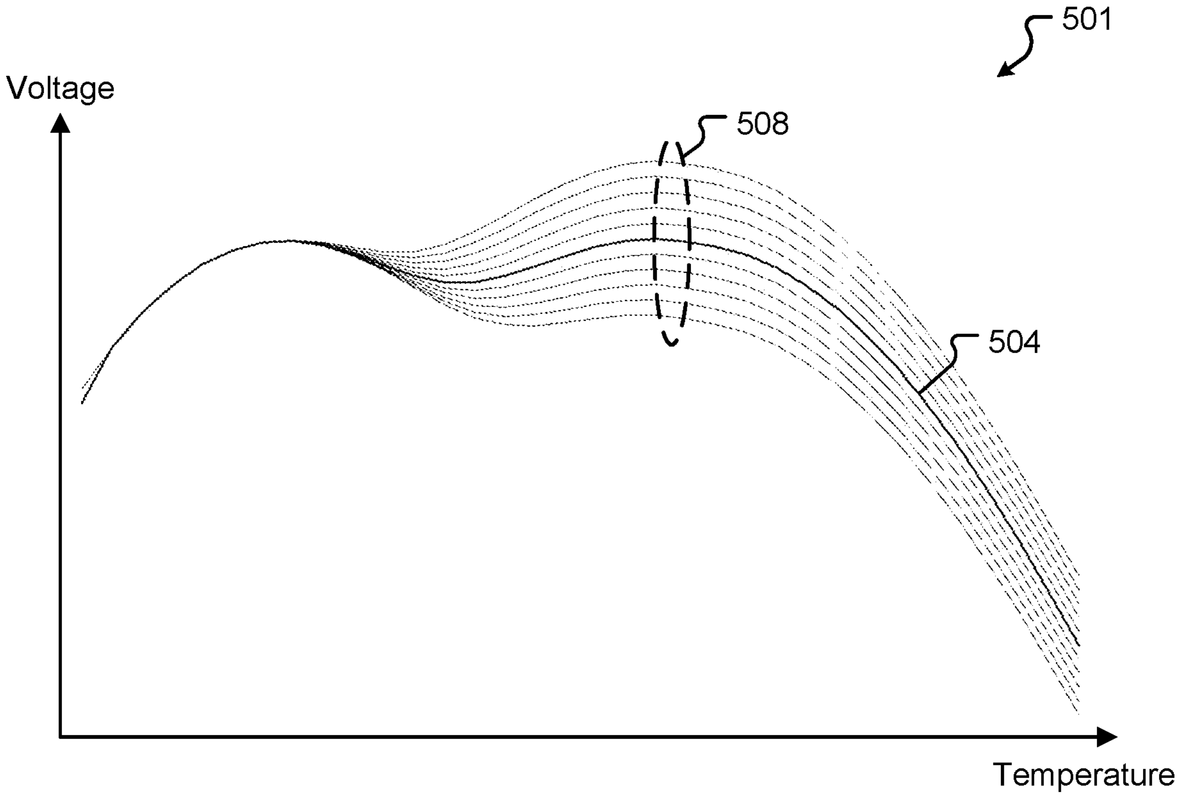

FIGS. 5A and 5B depict bandgap curvatures 500 and 501, respectively, according to at least one embodiment of the present disclosure. The bandgap curvatures 500 and 501 may implement or may be implemented by aspects of the system 100, the circuit 200, and the bandgap reference circuit 300 as described previously with reference to FIGS. 1-3. For example, the bandgap curvatures 500 and 501 may represent curvatures of a bandgap reference voltage (e.g., substantially constant voltage regardless of different PVT variations) generated by a bandgap reference circuit, such as the circuit 200 or the bandgap reference circuit 300 as described with reference to FIGS. 2 and 3. In some examples, the bandgap curvatures 500 and 501 may illustrate a lower TC for the bandgap reference circuit 300 compared to an original bandgap curve that does not include compensations as described herein (e.g., about 10 ppm/° C. compared to about 20 ppm/° C. for the original bandgap curve).

As described previously with reference to FIG. 3, when an additional current path is introduced and implemented in the bandgap reference circuit 300 via the bandgap device 228/third transistor 304C (e.g., after the third transistor 304C begins to conduct current as illustrated in the example of FIG. 4), an original bandgap curve is shifted to the right to generate a bandgap curve 504. In some examples, a peak of the bandgap curve 504 may occur at a higher temperature as compared to the original bandgap curve. Additionally, the additional current path through the bandgap device 228/third transistor 304C may cause the original bandgap curve to bend back upwards instead of falling down as shown in the example of the bandgap curvature 504 and FIG. 5A. By bending the bandgap curvature 504 back upward, the TC of the bandgap reference circuit 300 described herein may be lowered.

Additionally, by having an adjustable biasing subcircuit 220 as described with reference to FIGS. 2 and 3 (e.g., via an adjustable temperature independent voltage source, such as the temperature independent voltage source 316 as described with reference to FIG. 3), the peak of the bandgap curvature 504 may be adjusted to correspond to one of a plurality of bandgap curvatures 508 (e.g., that includes the bandgap curvature 504). For example, each of the plurality of bandgap curvatures 508 may correspond to a respective voltage level or amount generated or output by adjusting the adjustable temperature independent voltage source 316 (e.g., by setting or varying $V_{bias}$ to respective voltage levels). In some examples, the adjustable biasing subcircuit 220 may be adjusted to achieve a bandgap curvature from the plurality of bandgap curvatures 508 that includes an optimum point (e.g., an optimal peak value) that corresponds to a lowest TC (e.g., in ppm) for the bandgap reference circuit described herein.

Figure 6:
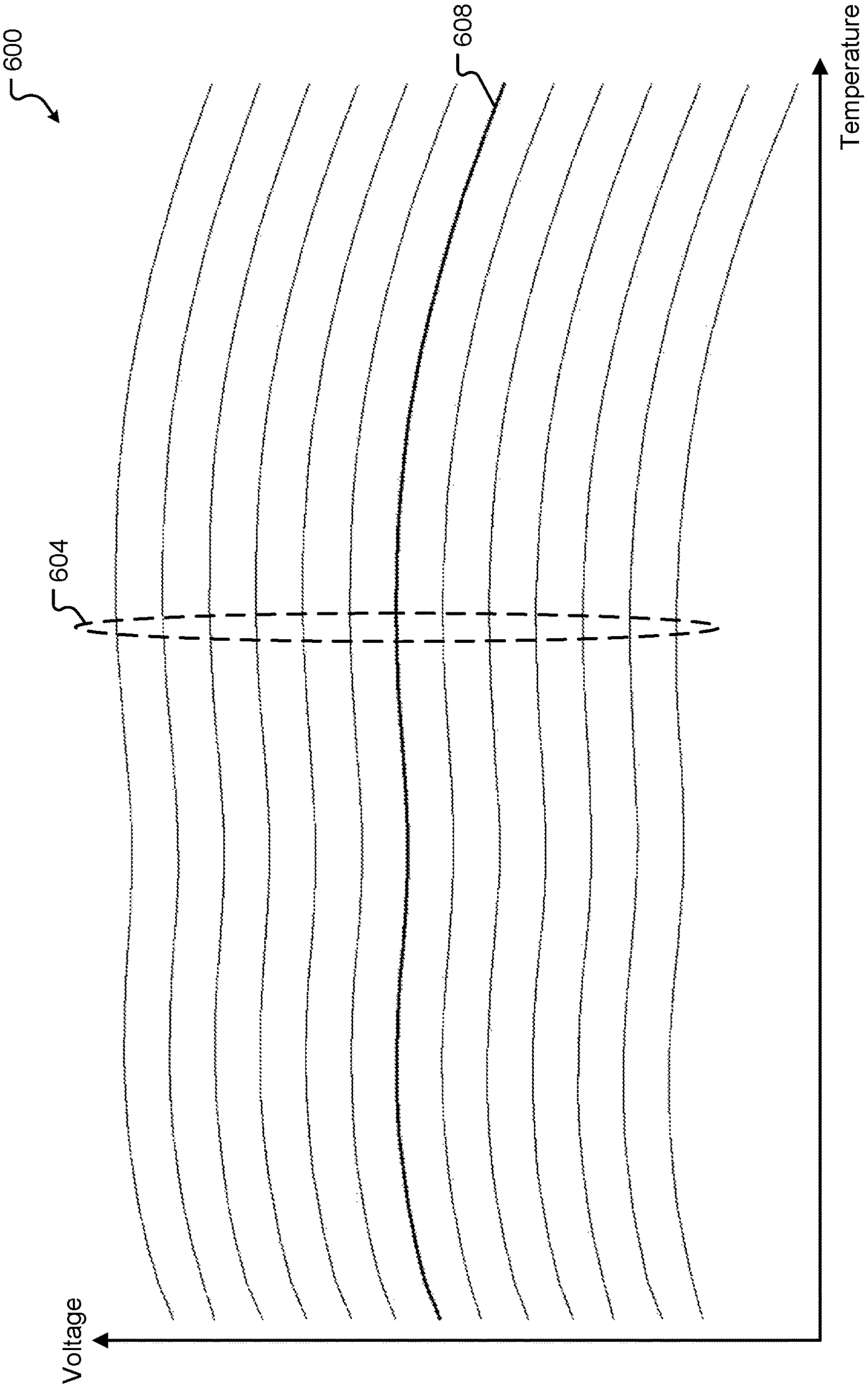
FIG. 6 is a set of bandgap curvatures according to at least one embodiment of the present disclosure.

FIG. 6 depicts bandgap curvatures 600 according to at least one embodiment of the present disclosure. The bandgap curvatures 600 may implement or may be implemented by aspects of the system 100, the circuit 200, and the bandgap reference circuit 300 as described previously with reference to FIGS. 1-3. For example, the bandgap curvatures 600 may include a set of bandgap curvatures 604 that represent possible bandgap curvatures generated for a bandgap reference voltage by a bandgap reference circuit, such as the circuit 200 and the bandgap reference circuit 300 as described with reference to FIGS. 2 and 3.

Each bandgap curvature of the set of bandgap curvatures 604 may correspond to a different resistance value of a variable resistor in the bandgap reference circuit 300, such as the second resistor 332 of the adjustable divider subcircuit 232. By adjusting or varying the resistance value of the second resistor 332, the bandgap reference circuit 300 may provide absolute adjustments to a bandgap curvature generated by the bandgap reference circuit 300 (e.g., such as the bandgap curvature 504 as described with reference to FIGS. 5A and 5B). For example, adjusting or varying the resistance value of the second resistor 332 may adjust a level of bandgap for the bandgap curvature 504 but not a shape or curvature of the bandgap curvature 504. Accordingly, an output of the bandgap reference circuit 300 (e.g., $V_{ref}$) may be varied within a state range while still maintaining a same or substantially similar bandgap curvature. For example, a bandgap curvature 608 of the plurality of bandgap curves 604 may be at a first substantially constant voltage level with a given shape or curvature. Accordingly, the resistance value of the second resistor 332 may be adjusted to adjust the level of bandgap, such that the bandgap curvature 608 corresponds to a different bandgap curvature of the set of bandgap curvatures 604 with a different substantially constant voltage level than the first substantially constant voltage level.

Figure 7:
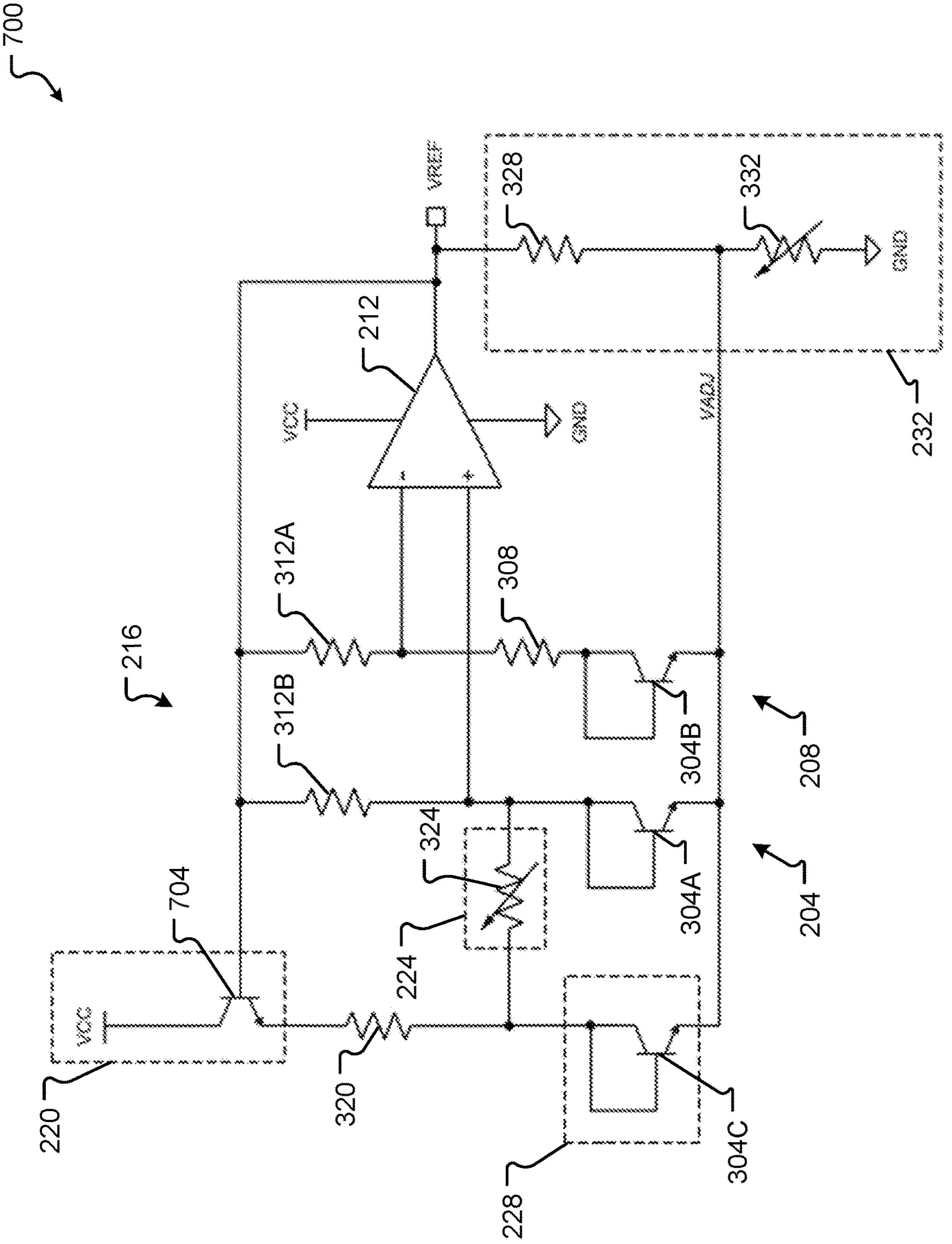
FIG. 7 is a bandgap reference circuit according to at least one embodiment of the present disclosure.

FIG. 7 depicts a bandgap reference circuit 700 according to at least one embodiment of the present disclosure. The bandgap reference circuit 700 may implement or may be implemented by aspects of the system 100, the circuit 200, and the bandgap reference circuit 300 as described previously with reference to FIGS. 1-3. For example, the bandgap reference circuit 700 may include the first subcircuit 204, the second subcircuit 208, the operational amplifier 212, the one or more feedback resistors 216, the biasing subcircuit 220, the resistor 224, the bandgap device 228, and the adjustable divider subcircuit 232 as described with reference to FIG. 2. Additionally, the bandgap reference circuit 700 may include the first transistor 304A (Q1), the second transistor 304B (Q2), the resistor 308 (R2), the first resistor 312A (R1), the second resistor 312B (R3), the third transistor 304C (Q3), the additional resistor 320 (R5), the resistor 324 (R4), the first resistor 328 (R6), and the second resistor 332 (R7) as described with reference to FIG. 3.

In some examples, the biasing subcircuit 220 may include a transistor 704 (e.g., the fourth transistor 304D (Q4) as described with reference to FIG. 3) and the additional resistor 320 (R5) (e.g., the biasing subcircuit 220 does not include the temperature independent voltage source 316 as described with reference to FIG. 3). Accordingly, in such examples, a base of the transistor 704 is coupled to the reference voltage at the output of the operational amplifier 212 and the one or more feedback resistors 216. Additionally, the additional resistor 320 may be coupled to an emitter of the transistor 704, the resistor 224, and the bandgap device 228.

As described herein, the bandgap reference circuit 700 may provide additional or alternative curvature adjustments for a bandgap curvature than the adjustments described with reference to FIG. 3. For example, the bandgap reference circuit 700 may bias a base of the transistor 704 from $V_{ref}$ directly. The reference voltage of the bandgap reference circuit 700 ($V_{ref}$) may behave like an independent voltage source. In some examples, $V_{ref}$ may behave like a fixed voltage source). Accordingly, with $V_{ref}$ substantially equal to 1.25 V (e.g., $V_{ref}$≈1.25 V), the condition(s) for the bandgap device 228 to begin to conduct current in the bandgap reference circuit 700 may correspond to the conditions and techniques as described with reference to FIGS. 3 and 4 to adjust as bandgap curvature of bandgap reference circuit 700.

The bandgap reference circuit 700 or similar circuits/systems may be used, for example, to carry out one or more aspects of any of the method 1100 described herein. The bandgap reference circuit 700 or similar circuits and systems may also be used for other purposes.

Figure 8:
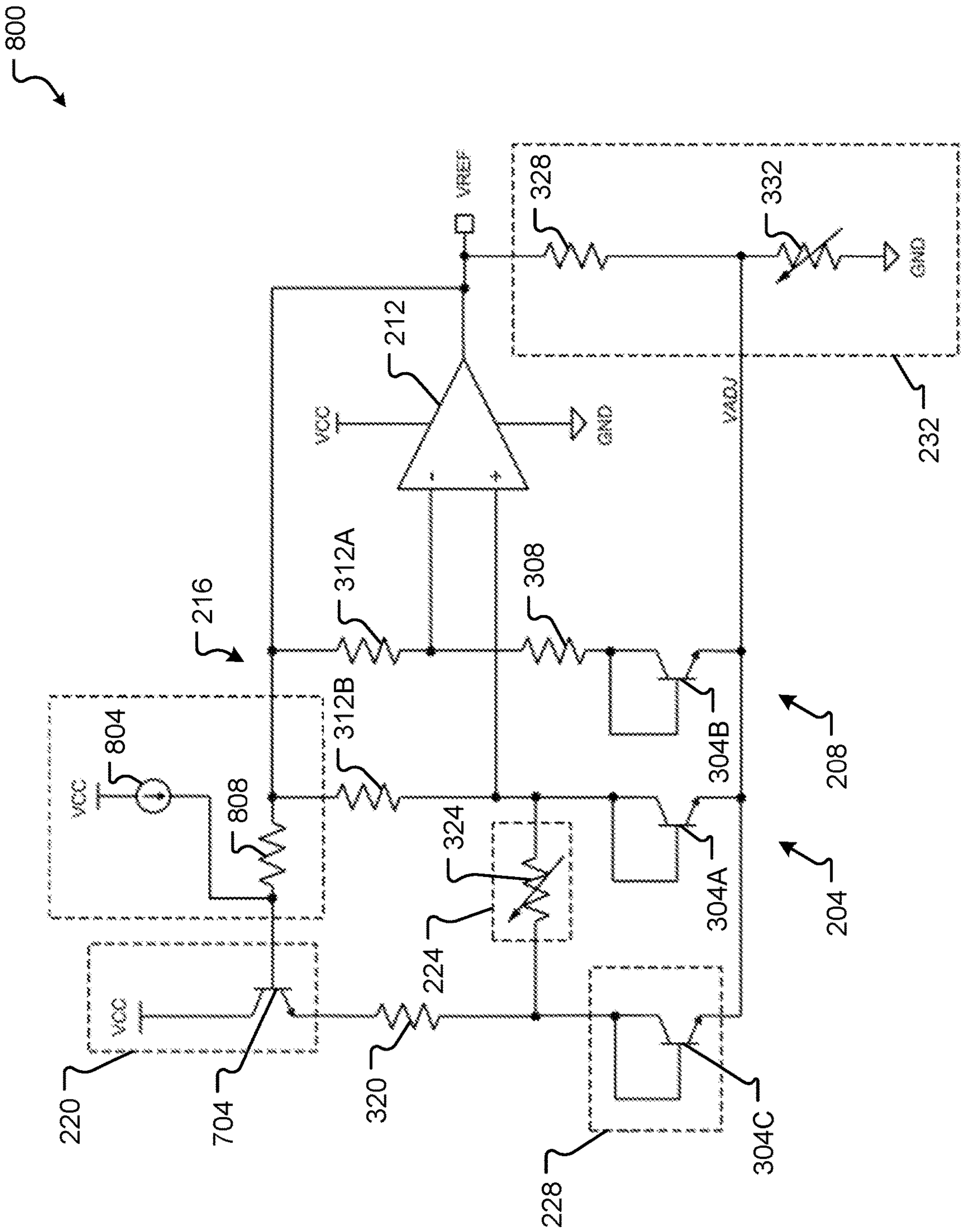
FIG. 8 is a bandgap reference circuit according to at least one embodiment of the present disclosure.

FIG. 8 depicts a bandgap reference circuit 800 according to at least one embodiment of the present disclosure. The bandgap reference circuit 800 may implement or may be implemented by aspects of the system 100, the circuit 200, the bandgap reference circuit 300, and the bandgap reference circuit 700 as described previously with reference to FIGS. 1-3 and 7. For example, the bandgap reference circuit 800 may include the first subcircuit 204, the second subcircuit 208, the operational amplifier 212, the one or more feedback resistors 216, the biasing subcircuit 220, the resistor 224, the bandgap device 228, and the adjustable divider subcircuit 232 as described with reference to FIG. 2. Additionally, the bandgap reference circuit 800 may include the first transistor 304A (Q1), the second transistor 304B (Q2), the resistor 308 (R2), the first resistor 312A (R1), the second resistor 312B (R3), the third transistor 304C (Q3), the additional resistor 320 (R5), the resistor 324 (R4), the first resistor 328 (R6), and the second resistor 332 (R7) as described with reference to FIG. 3. Additionally, the bandgap reference circuit 800 may include the transistor 704 as described with reference to FIG. 7.

In some examples, the bandgap reference circuit 800 may include an adjustable current generator 804 and an additional resistor 808 (R8). The adjustable current generator 804 may be coupled to the biasing subcircuit 220 (e.g., via a base of the transistor 704 as described with reference to FIG. 7) and the additional resistor 808, and the additional resistor 808 may be coupled to the adjustable current generator 804, the output of the operational amplifier 212 (e.g., $V_{ref}$), and the one or more feedback resistors 216. In some examples, the reference voltage may be dependent on the adjustable current generator 804 based on the coupling of the additional resistor 808.

Based on the adjustable current generator 804 and the additional resistor 808, the bandgap reference circuit 800 may adjust a bias (e.g., a DC bias) to a base of the transistor 704. In some examples, the current generated by the adjustable current generator 804 (e.g., referenced as $I_{adjust}$) may be a positive or a negative current. A base voltage of the transistor 704 may be given as:

$$V_{bQ4}=V_{ref}+I_{adjust}*R8 \tag{7}$$

where $V_{bQ4}$ represents the base voltage for the transistor 704 and R8 represents a resistance value of the additional resistor 808. When $I_{adjust}$ is positive, the voltage at the transistor 704 (e.g., $V_{bQ4}$) may increase, and when $I_{adjust}$ is negative, the voltage at the transistor 704 (e.g., $V_{bQ4}$) may decrease. Accordingly, the bandgap reference circuit 800 may conditionally have current flow through the bandgap device 228 based in part on adjusting $I_{adjust}$ to shift a bandgap curvature as described herein, for example, to achieve a lower TC.

The bandgap reference circuit 800 or similar circuits/systems may be used, for example, to carry out one or more aspects of any of the method 1100 described herein. The bandgap reference circuit 800 or similar circuits and systems may also be used for other purposes.

Figure 9:
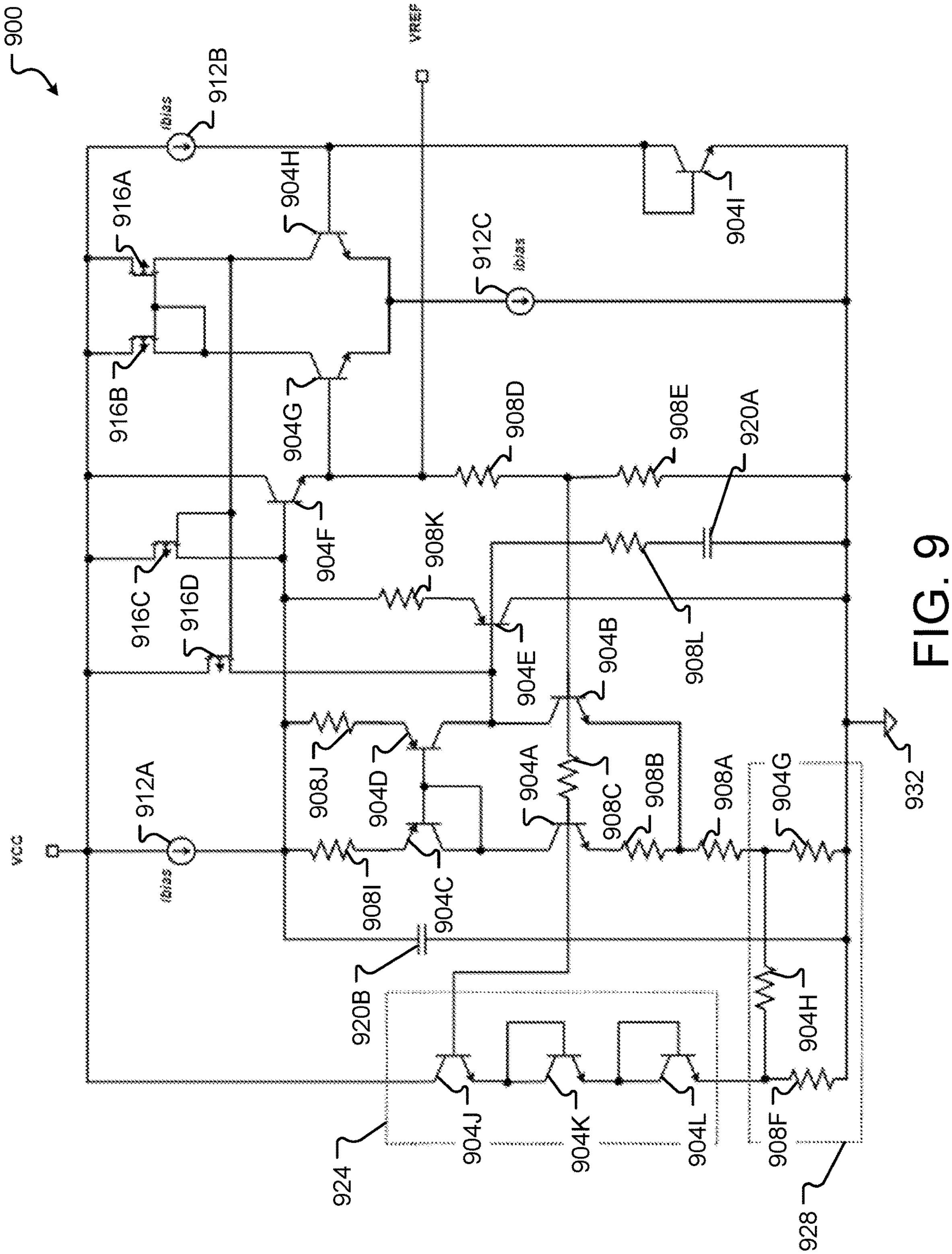
FIG. 9 is a bandgap reference circuit according to at least one embodiment of the present disclosure.

FIG. 9 depicts a bandgap reference circuit 900 according to at least one embodiment of the present disclosure. The bandgap reference circuit 900 may implement or may be implemented by aspects of components as described with reference to FIGS. 1-3 and 7-8. For example, the bandgap reference circuit 900 may include one or more transistors 904, one or more resistors 908, one or more current generators 912, and a ground 932, which may represent examples of corresponding components as described with reference to FIGS. 1-3 and 7-8. Additionally, the bandgap reference circuit 900 may include one or more metal-oxide-semiconductor field-effect transistor (MOSFET) devices 916 and one or more capacitors 920.

In some examples, the one or more transistors 904 may include a first transistor 904A (Q1), a second transistor 904B (Q2), a third transistor 904C (Q3), a fourth transistor 904D (Q4), a fifth transistor 904E (Q5), a sixth transistor 904F (Q6), a seventh transistor 904G (Q7), an eighth transistor 904H (Q8), a ninth transistor 904I (Q9), a tenth transistor 904J (Q10), an eleventh transistor 904K (Q11), and a twelfth transistor 904L (Q12). The one or more resistors 908 may include a first resistor 908A (R1), a second resistor 908B (R2), a third resistor 908C (R3), a fourth resistor 908D (R4), a fifth resistor 908E (R5), a sixth resistor 908F (R6), a seventh resistor 908G ($R1_{TUNE}$), an eighth resistor 908H ($RC_{TUNE}$), a ninth resistor 908I (RB1), a tenth resistor 908J (RB2), an eleventh resistor 908K (RB3), and a twelfth resistor 908L (RC). The one or more current generators 912 may include a first current generator 912A, a second current generator 912B, and a third current generator 912C. The one or more MOSFET devices 916 may include a first MOSFET device 916A, a second MOSFET device 916B, a third MOSFET device 916C, and a fourth MOSFET device 916D. The one or more capacitors 920 may include a first capacitor 920A (CS) and a second capacitor 920B (CC).

In some examples, the bandgap reference circuit 900 may include a compensation subcircuit 924 that comprises the tenth transistor 904J (Q10), the eleventh transistor 904K (Q11), and the twelfth transistor 904L (Q12). In some embodiments, the compensation subcircuit 924 may provide a curvature compensation to a bandgap voltage curvature produced by the bandgap reference circuit 900. For example, the tenth transistor 904J (Q10), the eleventh transistor 904K (Q11), and the twelfth transistor 904L (Q12) may be considered a diode stack or a transistor stack that conditionally conducts current in the bandgap reference circuit 900 at higher temperatures. That is, at lower or colder temperatures, the sum of the diode stack bias voltage may be greater than a constant voltage node to which a base of the tenth transistor 904J (Q10) is connected (e.g., $V_{ref}$ or the substantially constant voltage output of the bandgap reference circuit 900), the stack will not conduct current. Subsequently, at higher temperatures, the stack of the tenth transistor 904J (Q10), the eleventh transistor 904K (Q11), and the twelfth transistor 904L (Q12) may conduct current to provide compensation to the bandgap voltage curvature produced by the bandgap reference circuit 900, such that the bandgap voltage curvature bends back upwards instead of falling down. In some examples, the compensation subcircuit 924 may provide a temperature dependent compensation for the bandgap reference circuit 900 based on conditionally conducting current in the bandgap reference circuit 900 as temperature increases and may also provide a temperature independent compensation based on being connected to the substantially constant voltage.

Additionally, the bandgap reference circuit 900 may include a tuning subcircuit 928 that comprises the sixth resistor 908F (R6), the seventh resistor 908G ($R1_{TUNE}$), and the eighth resistor 908H ($RC_{TUNE}$). In some embodiments, the tuning subcircuit 928 may provide curvature compensation tuning for the bandgap voltage curvature produced by the bandgap reference circuit 900. For example, the seventh resistor 908G ($R1_{TUNE}$) and the eighth resistor 908H ($RC_{TUNE}$) may be tunable to adjust the bandgap voltage curvature to generate a desired curvature (e.g., a flattest curvature to increase how stable or substantially constant the reference voltage produced by the bandgap reference circuit 900 is). In some examples, the tuning subcircuit 928 may provide a non-temperature compensation or non-temperature curvature adjustment for the bandgap reference circuit 900. Examples of bandgap voltage curvatures generated by the bandgap reference circuit 900 are illustrated and discussed in greater detail with reference to FIGS. 10A and 10B.

In some examples, the bandgap reference circuit 900 may include a start-up circuit that comprises the seventh transistor 904G (Q7) and the eighth transistor 904H (Q8). For example, when an output of the bandgap reference circuit 900 is below a start-up voltage threshold, the start-up circuit provides a first voltage at an input of the bandgap reference circuit 900 which, in turn, may cause the bandgap reference circuit 900 to produce a desired voltage at the output. When the desired voltage has been reached (e.g., a voltage corresponding to the start-up voltage threshold), the start-up circuit may turn off and not interfere with normal operations of the bandgap reference circuit 900. Additionally, the ninth transistor 904I (Q9) may be referred to or be described as a start-up reference for the bandgap reference circuit 900. In some examples, the fifth resistor 908E (R5), the twelfth resistor 908L (RC), and the second capacitor 920B (CC) (e.g., and any other components connected to a same node as those components) may provide frequency compensation for the bandgap reference circuit 900.

In some examples, the portions and components of the bandgap reference circuit 900 that are not included in the compensation subcircuit 924, the tuning subcircuit 928, the start-up circuit, the start-up reference, and the frequency compensation may be referred to as a primary subcircuit of the bandgap reference circuit 900. For example, the primary subcircuit and corresponding components may generate an uncompensated or non-compensated bandgap voltage curvature that corresponds to a substantially constant voltage, but the substantially constant voltage still may vary to a higher degree than is desired. Accordingly, the compensation subcircuit 924 and the tuning subcircuit 928 may be included in the bandgap reference circuit 900 and coupled to the primary subcircuit (e.g., and other components of the start-up circuit, the start-up reference, and the frequency compensation) to minimize the variations in the substantially constant voltage produced by the bandgap reference circuit 900.

Figure 10A:
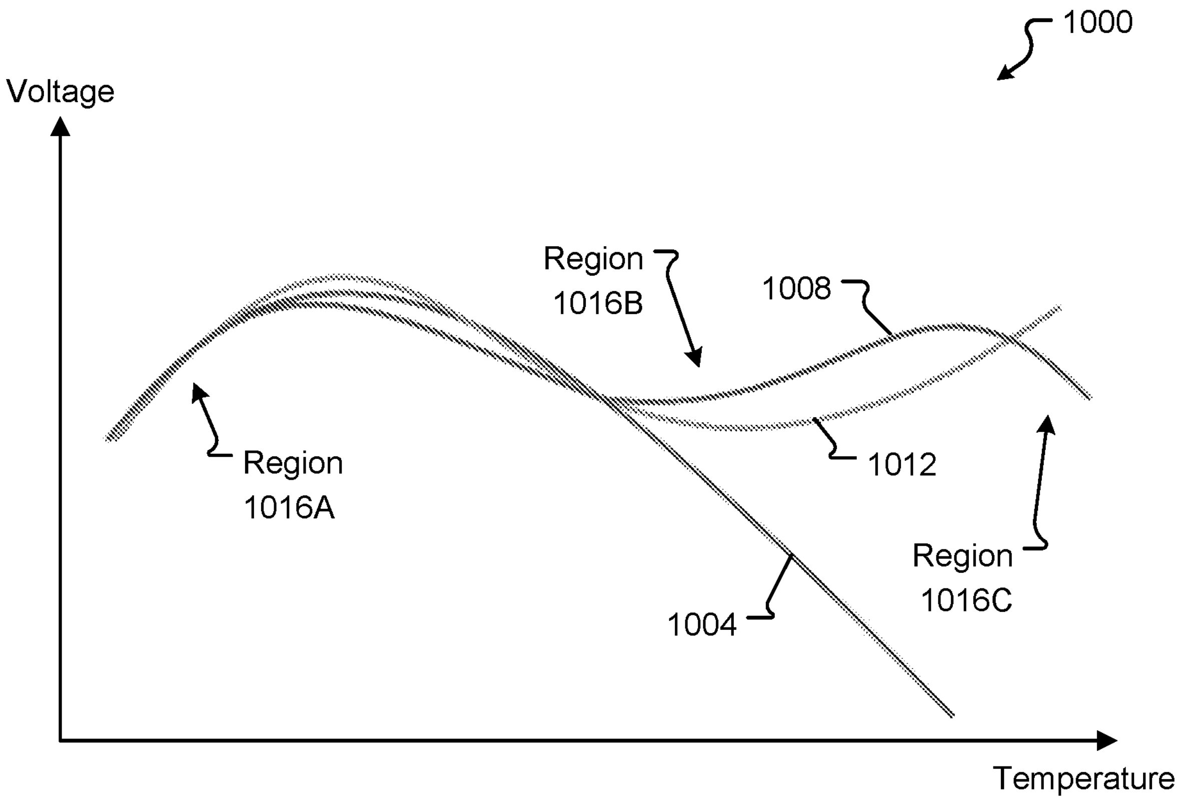
FIGS. 10A and 10B are bandgap curvatures according to at least one embodiment of the present disclosure.
Figure 10B:
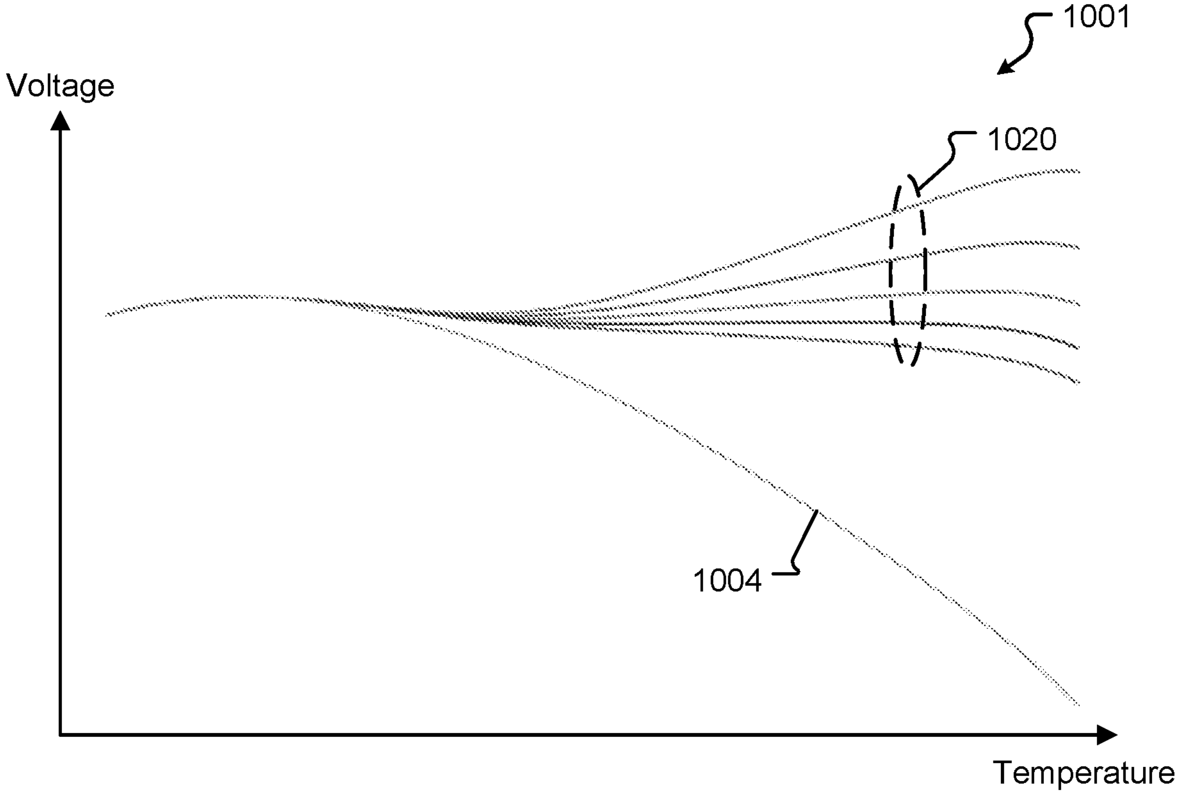

FIGS. 10A and 10B depict bandgap curvatures 1000 and 1001, respectively, according to at least one embodiment of the present disclosure. The bandgap curvatures 1000 and 1001 may implement or may be implemented by aspects of the bandgap reference circuit 900 as described previously with reference to FIG. 9. For example, the bandgap curvatures 1000 and 1001 may represent curvatures of a bandgap reference voltage (e.g., substantially constant voltage regardless of different PVT variations) generated by a bandgap reference circuit, such as the bandgap reference circuit 900 as described with reference to FIG. 9.

As illustrated in FIGS. 10A and 10B, an uncompensated bandgap curvature 1004 may be produced in a typical bandgap reference circuit, where the voltage produced by the bandgap reference circuit begins to decrease as temperature increases. For example, as described with reference to FIG. 9, the primary subcircuit of the bandgap reference circuit 900 (e.g., along with the start-up circuit, the start-up reference, and the frequency compensation) may generate the uncompensated bandgap curvature 1004. While the decrease is typically small (e.g., the substantially constant voltage may vary by about 2-3 mV depending on the temperature), a more stable voltage (e.g., less variation) may be desired. Accordingly, the compensation subcircuit 924 and the tuning subcircuit 928, as described with reference to FIG. 9, may be included in the bandgap reference circuit 900 and coupled to the primary subcircuit (e.g., and other components of the start-up circuit, the start-up reference, and the frequency compensation) to produce a compensated bandgap curvature 1008 and/or a second order compensated bandgap curvature 1012 that minimize the variations in the substantially constant voltage produced by the bandgap reference circuit 900.

For example, from the primary subcircuit, the bandgap reference circuit 900 may operate under the principle that the bias base emitter voltage of the transistors of the compensation subcircuit 924 (e.g., the tenth transistor 904J (Q10), the eleventh transistor 904K (Q11), and the twelfth transistor 904L (Q12) as described with reference to FIG. 9) have a negative TC of about −2 mV/° C. Because the stack of transistors (e.g., "diode stack" or transistor stack) is biased at a temperature stable voltage node (e.g., the base of the tenth transistor 904J (Q10) is coupled to the bandgap voltage generated by the bandgap reference circuit 900) and, if at cold temperatures, the sum of the bias voltage across the stack of transistors is greater than the constant voltage node, the stack may not conduct current in the bandgap reference circuit 900. Accordingly, the compensated bandgap curvature 1008 and the second order compensated bandgap curvature 1012 may behave similar to the uncompensated bandgap curvature 1004 at lower temperatures. The similar behavior between the different bandgap curvatures is marked by a region 1016A as shown in the example of FIG. 10A.

At higher temperatures, the sum of the base emitter voltages across the stack of transistors in the compensation subcircuit 924 may be smaller than the substantially constant voltage produced by the bandgap reference circuit 900, and the stack of transistors may begin to conduct current to generate a voltage signal, which when applied to the uncompensated bandgap curvature 1004 (e.g., at a node where the bandgap voltage will increase) that tilts the uncompensated bandgap curvature 1004 to the positive (e.g., as illustrated by the compensated bandgap curvature 1008 and/or the second order compensated bandgap curvature 1012). The compensation provided by the compensation subcircuit 924 to tilt the uncompensated bandgap curvature 1004 to the positive is marked by a region 1016B as shown in the example of FIG. 10B.

When the current conducted by the stack of transistors in the compensation subcircuit 924 increases further, the effect of the compensation subcircuit 924 may progressively get smaller than the negative tilting trend of the uncompensated bandgap curvature 1004, and the compensated bandgap curvatures (e.g., the compensated bandgap curvature 1008 and/or the second order compensated bandgap curvature 1012) may fold back downwards again. The folding back down of the compensated bandgap curvatures is marked by a region 1016C as shown in the example of FIG. 10A.

As shown in the example of FIG. 10B and to mitigate the folding back down of the compensated bandgap curvatures as described, the bandgap reference circuit 900 may be tunable using the tunable subcircuit 928 as described with reference to FIG. 9 (e.g., including the seventh resistor 908G ($R1_{TUNE}$) and the eighth resistor 908H ($RC_{TUNE}$)) to adjust the voltage curvatures to achieve a flattest possible curve (e.g., least amount of variation in the substantially constant voltage generated by the bandgap reference circuit 900) or a desired curvature. For example, using the tunable subcircuit 928, the bandgap reference circuit 900 may produce a relatively flat bandgap voltage curvature (e.g., compared to the uncompensated bandgap curvature 1004) of a set of possible bandgap voltage curvatures 1020 as shown in the example of FIG. 10B. By appropriately adjusting the amount of voltage signal to be added to the uncompensated bandgap curvature 1004 (e.g., using the tunable subcircuit 928), a flatter curvature can be obtained for the substantially constant voltage generated by the bandgap reference circuit 900.

Figure 11:
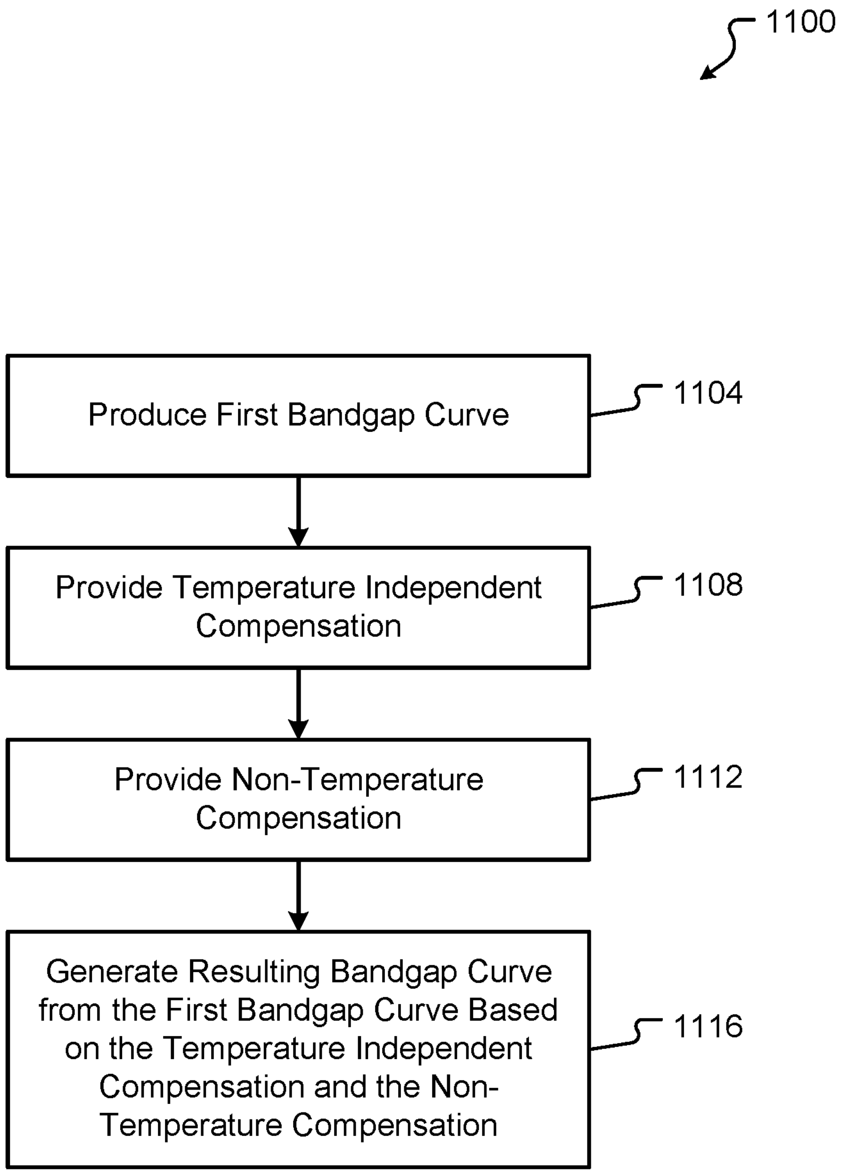
FIG. 11 is a flowchart according to at least one embodiment of the present disclosure.

FIG. 11 depicts a flowchart of a method 1100 that may be used, for example, to provide compensations for a bandgap curvature generated by a bandgap reference circuit as described herein. In some examples, the method 1100 may be used, for example, to lower a TC of the bandgap reference circuit.

The method 1100 (and/or one or more steps thereof) may be carried out or otherwise performed, for example, by at least one circuit. The at least one circuit may be the same as or similar to the circuit 200, the bandgap reference circuit 300, the bandgap reference circuit 700, the bandgap reference circuit 800, and/or the bandgap reference circuit 900 described above.

The method 1100 comprises producing a first bandgap curve based on a first circuit, a second circuit, an operational amplifier, and one or more feedback resistors (step 1104). For example, the first circuit may correspond to the first subcircuit 204 as described herein, the second circuit may correspond to the second subcircuit 208 as described herein, the operational amplifier may correspond to the operational amplifier 212 as described herein, and the one or more feedback resistors may correspond to the one or more feedback resistors 216 as described herein. In some examples, the first circuit may correspond to a first voltage that is CTAT, and the second circuit may correspond to a second voltage that is PTAT. Additionally or alternatively, the first bandgap curve may be produced by a primary subcircuit of a bandgap reference circuit as described with reference to FIGS. 9, 10A, and 10B.

The method 1100 also comprises providing a temperature independent compensation to the first bandgap curve based on a bandgap device, a biasing circuit, and a resistor (step 1108). For example, the bandgap device may correspond to the bandgap device 228 as described herein, the biasing circuit may correspond to the biasing subcircuit 220 as described herein, and the resistor may correspond to the resistor 224 as described herein. In some examples, the resistor may control and balance a current flowing through the first subcircuit and the bandgap device. For example, the resistor may be a variable resistor that has an adjustable resistance value to control how much current flows through the first subcircuit and the bandgap device.

In some examples, the bandgap device may conditionally conduct current based on a voltage across a base and an emitter of the bandgap device being less than a voltage associated with the biasing subcircuit, a temperature of the circuit being greater than or equal to a threshold value, a temperature of an environment surrounding the circuit being greater than or equal to the threshold value, or a combination thereof. In some examples, when the bandgap device conducts current (e.g., based on one or more of the conditions described), the bandgap device may produce an additional bandgap curve such that, when the additional bandgap curve is applied to the first bandgap curve, a resulting bandgap curve is produced that comprises an adjusted version of the first bandgap curve.

In some examples and as described with reference to FIG. 3, the biasing subcircuit may comprise a temperature independent voltage source, a transistor (e.g., where a base of the transistor is coupled to the temperature independent voltage source), and an additional resistor (e.g., where a first end of the additional resistor is coupled to an emitter of the transistor and an opposing end of the additional resistor not coupled to the emitter is coupled to the resistor and the bandgap device). For example, the temperature independent voltage source may correspond to the temperature independent voltage source 316 as described herein, the transistor may correspond to the fourth transistor 304D as described herein, and the additional resistor may correspond to the additional resistor 320 as described herein. In such examples, the temperature independent voltage source may be adjustable to adjust a peak of the resulting bandgap curve described above. Additionally, in some examples, adjusting the peak of the second bandgap curve may lower a TC of the bandgap reference circuit. In some examples, the temperature independent voltage source may be set to 1.25 V.

Additionally or alternatively, as described with reference to FIGS. 7 and 8, the biasing subcircuit may comprise a transistor (e.g., where a base of the transistor is coupled to the reference voltage at the output of the operational amplifier and the one or more feedback resistors) and an additional resistor coupled to an emitter of the transistor, the resistor, and the bandgap device. For example, the transistor may correspond to the transistor 704 as described herein, and the additional resistor may correspond to the additional resistor 320 as described herein. In such examples, the reference voltage at the output of the operational amplifier or at the output of the bandgap reference circuit may be considered a fixed voltage source. Additionally or alternatively, the bandgap reference circuit may include an adjustable current generator coupled to the biasing subcircuit and another resistor coupled to the adjustable current generator, the output of the operational amplifier, and the one or more feedback resistors. For example, the adjustable current generator may correspond to the adjustable current generator 804 as described herein, and the other resistor may correspond to the additional resistor 808 as described herein. In such examples, the reference voltage may be dependent on the adjustable current generator based on the coupling of the other resistor.

Additionally or alternatively, as described with reference to FIGS. 9, 10A, and 10B, a compensation subcircuit may provide a temperature dependent compensation to the first bandgap curve based on conditionally conducting current as temperature increases and may also provide a temperature independent compensation based on being connected to a substantially constant voltage.

The method 1100 also comprises providing a non-temperature compensation to the first bandgap curve based on an adjustable divider circuit (step 1112). In some examples, the adjustable divider subcircuit may comprise a first resistor (e.g., coupled to the output of the operational amplifier, the bandgap device, the first subcircuit, and the second subcircuit) and a second resistor (e.g., coupled to the first resistor, the bandgap device, the first subcircuit, and the second subcircuit). For example, the first resistor may correspond to the first resistor 328 as described herein, and the second resistor may correspond to the second resistor 332 as described herein. In some examples, the second resistor may be a variable resistor that is adjustable to resistance values between 0% and 5% of a resistance value for the first resistor. Additionally, the adjustable divider subcircuit may be substantially temperature independent based on the first resistor being coupled to the output of the operational amplifier (e.g., $V_{ref}$). In some examples, a resistance value for the second resistor may be affected by a magnitude of 5% or less based on a temperature of the circuit changing or a temperature of a surrounding environment changing.

Additionally or alternatively, the non-temperature compensation may be provided to the first bandgap curve based on a tunable subcircuit that adjusts the first bandgap curve to generate a flatter curve (e.g., less variation).

The method 1100 also comprises generating a resulting bandgap curve from the first bandgap curve based on the temperature independent compensation and the non-temperature compensation (step 1116). In some examples, the resulting bandgap curve may include a shifted peak that occurs at a higher temperature compared to a peak of the first bandgap curve, a flatter curve compared to the first bandgap curve, or both. Additionally, the resulting bandgap curve may include a lower TC compared to a TC corresponding to the first bandgap curve (e.g., where the first bandgap curve is produced based on the first circuit, the second circuit, the operational amplifier, and the one or more feedback resistors without the temperature independent compensation and the non-temperature compensation being taken into account).

The present disclosure encompasses embodiments of the method 1100 that comprise more or fewer steps than those described above, and/or one or more steps that are different than the steps described above.

As noted above, the present disclosure encompasses methods with fewer than all of the steps identified in FIG. 11 (and the corresponding description of the method 1100), as well as methods that include additional steps beyond those identified in FIG. 11 (and the corresponding description of the method 1100). The present disclosure also encompasses methods that comprise one or more steps from one method described herein, and one or more steps from another method described herein. Any correlation described herein may be or comprise a registration or any other correlation.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A circuit for providing a bandgap voltage reference, comprising:

a first subcircuit that corresponds to a first voltage that is complementary to absolute temperature (CTAT);

a second subcircuit that corresponds to a second voltage that is proportional to absolute temperature (PTAT);

an operational amplifier that receives the first voltage of the first subcircuit and the second voltage of the second subcircuit, wherein a reference voltage is produced at an output of the operational amplifier based at least in part on the first voltage and the second voltage;

one or more feedback resistors coupled to the output of the operational amplifier and the first subcircuit, coupled to the output of the operational amplifier and the second subcircuit, or a combination thereof;

a biasing subcircuit coupled to the first subcircuit via a resistor, wherein the biasing subcircuit is substantially temperature independent and provides adjustments to a curvature of the reference voltage;

the resistor coupled to the biasing subcircuit and the first subcircuit, wherein the resistor, in part, controls the curvature of the reference voltage;

a bandgap device coupled to the biasing subcircuit and the resistor, the bandgap device providing an alternate path for current to flow in the circuit via the resistor, wherein the bandgap device, in part, flattens the curvature of the reference voltage; and an adjustable divider subcircuit coupled to the output of the operational amplifier, the first subcircuit, the second subcircuit, and the bandgap device, wherein the adjustable divider subcircuit provides non-temperature adjustments to the curvature of the reference voltage.

2. The circuit of claim 1, wherein the reference voltage produced at the output of the operational amplifier comprises a temperature independent compensation and a non-temperature compensation, the temperature independent compensation being applied to the reference voltage based at least in part on the bandgap device and the biasing subcircuit, and the non-temperature compensation being applied to the reference voltage based at least in part on the adjustable divider subcircuit.

3. The circuit of claim 1, wherein the biasing subcircuit comprises:

a temperature independent voltage source;

a transistor, wherein a base of the transistor is coupled to the temperature independent voltage source; and an additional resistor coupled to an emitter of the transistor, wherein an opposing end of the additional resistor not coupled to the emitter is coupled to the resistor and the bandgap device.

4. The circuit of claim 3, wherein the temperature independent voltage source is adjustable to adjust a peak of a bandgap curve associated with the bandgap device, and wherein adjusting the peak of the bandgap curve lowers a temperature coefficient of the circuit.

5. The circuit of claim 3, wherein the temperature independent voltage source is set to 1.25 volts (V).

6. The circuit of claim 1, wherein the bandgap device conditionally conducts current in the circuit based at least in part on a voltage across a base and an emitter of the bandgap device being less than a voltage associated with the biasing subcircuit, a temperature of the circuit being greater than or equal to a threshold value, a temperature of an environment surrounding the circuit being greater than or equal to the threshold value, or a combination thereof.

7. The circuit of claim 1, wherein the first subcircuit and the second subcircuit produce a first bandgap curve via the operational amplifier, and the bandgap device produces an additional bandgap curve such that, when the additional bandgap curve is applied to the first bandgap curve, a resulting bandgap curve is produced that comprises an adjusted version of the first bandgap curve.

8. The circuit of claim 7, wherein the adjusted version of the first bandgap curve comprises the resulting bandgap curve having a shifted peak that occurs at a higher temperature compared to a peak of the first bandgap curve, the resulting bandgap having a flatter curve compared to the first bandgap curve, or both.

9. The circuit of claim 1, wherein the resistor controls the current flowing through the first subcircuit and the bandgap device.

10. The circuit of claim 1, wherein the adjustable divider subcircuit comprises:

a first resistor coupled to the output of the operational amplifier, the bandgap device, the first subcircuit, and the second subcircuit; and a second resistor coupled to the first resistor, the bandgap device, the first subcircuit, and the second subcircuit.

11. The circuit of claim 10, wherein the second resistor comprises a variable resistor that is adjustable to resistance values between 0% and 5% of a resistance value for the first resistor.

12. The circuit of claim 10, wherein the adjustable divider subcircuit is substantially temperature independent based at least in part on the first resistor being coupled to the output of the operational amplifier.

13. The circuit of claim 10, wherein a resistance value for the second resistor is affected by a magnitude of 5% or less based at least in part on a temperature of the circuit changing or a temperature of a surrounding environment changing.

14. The circuit of claim 1, wherein the biasing subcircuit comprises:

a transistor, wherein a base of the transistor is coupled to the reference voltage at the output of the operational amplifier and the one or more feedback resistors; and an additional resistor coupled to an emitter of the transistor, the resistor, and the bandgap device.

15. The circuit of claim 1, further comprising:

an adjustable current generator coupled to the biasing subcircuit and an additional resistor; and the additional resistor coupled to the adjustable current generator, the output of the operational amplifier, and the one or more feedback resistors, wherein the reference voltage is dependent on the adjustable current generator based at least in part on the coupling of the additional resistor.

16. The circuit of claim 1, wherein the resistor comprises a variable resistor that has an adjustable resistance value to control how much current flows through the first subcircuit and the bandgap device.

17. The circuit of claim 1, wherein:

the first subcircuit comprises a first transistor;

the second subcircuit comprises a second transistor and an additional resistor;

the bandgap device comprises a third transistor; and the biasing subcircuit comprises a fourth transistor.

* * * * *